(12) United States Patent
Kalyanasundharam et al.

(10) Patent No.: US 10,223,280 B2
(45) Date of Patent: Mar. 5, 2019

(54) INPUT/OUTPUT MEMORY MAP UNIT AND NORTHBRIDGE

(71) Applicants: Advanced Micro Devices, Inc., Santa Clara, CA (US); ATI Technologies ULC, Markham (CA)

(72) Inventors: Vydhyanathan Kalyanasundharam, Santa Clara, CA (US); Yaniv Adiri, Rishon LeZion (IL); Philip Ng, Markham (CA); Maggie Chan, Markham (CA); Vincent Cueva, Markham (CA); Anthony Asaro, Markham (CA); Jimshed Mirza, Markham (CA); Greggory D. Donley, Santa Clara, CA (US); Bryan Broussard, Austin, TX (US); Benjamin Tsien, Santa Clara, CA (US)

(73) Assignees: Advanced Micro Devices, Inc., Santa Clara, CA (US); ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 16/025,449

(22) Filed: Jul. 2, 2018

(65) Prior Publication Data

US 2018/0307619 A1 Oct. 25, 2018

Related U.S. Application Data

(63) Continuation of application No. 14/523,705, filed on Oct. 24, 2014, now Pat. No. 10,025,721.

(Continued)

(51) Int. Cl.
*G06F 3/14* (2006.01)
*G06F 13/38* (2006.01)
(Continued)

(52) U.S. Cl.
CPC ...... *G06F 12/1009* (2013.01); *G06F 12/1045* (2013.01); *G06F 12/12* (2013.01); *G06F 2212/684* (2013.01)

(58) Field of Classification Search
None
See application file for complete search history.

(56) References Cited

U.S. PATENT DOCUMENTS

2005/0071571 A1 3/2005 Luick
2008/0301398 A1 12/2008 Falik et al.
(Continued)

FOREIGN PATENT DOCUMENTS

JP S63298652 A 12/1988
JP H0223458 A 1/1990
(Continued)

*Primary Examiner* — Scott C Sun
(74) *Attorney, Agent, or Firm* — Volpe and Koenig, P.C.

(57) ABSTRACT

A system including a gasket communicatively coupled between a unified northbridge (UNB) having a cache coherent interconnect (CCI) interface and a processor having an Advanced eXtensible Interface (AXI) coherency extension (ACE). The gasket is configured to translate requests from the processor that include ACE commands into equivalent CCI commands, wherein each request from the processor maps onto a specific CCI request type. The gasket is further configured to translate ACE tags into CCI tags. The gasket is further configured to translate CCI encoded probes from a system resource interface (SRI) into equivalent ACE snoop transactions. The gasket is further configured to translate the memory map to inter-operate with a UNB/coherent HyperTransport (cHT) environment. The gasket is further configured to receive a barrier transaction that is used to provide ordering for transactions.

20 Claims, 9 Drawing Sheets

Related U.S. Application Data

(60) Provisional application No. 61/896,092, filed on Oct. 27, 2013.

(51) Int. Cl.
    *G06F 12/1009*    (2016.01)
    *G06F 12/12*       (2016.01)
    *G06F 12/1045*    (2016.01)

(56) References Cited

U.S. PATENT DOCUMENTS

| | | |
|---|---|---|
| 2009/0006805 A1 | 1/2009 | Anderson et al. |
| 2010/0223447 A1 | 9/2010 | Serebrin |
| 2012/0311303 A1 | 12/2012 | Hansen et al. |
| 2012/0317571 A1* | 12/2012 | Chang .................. G06F 1/3293 718/1 |
| 2013/0227248 A1 | 8/2013 | Mehta et al. |
| 2014/0337585 A1 | 11/2014 | Grisenthwaite et al. |

FOREIGN PATENT DOCUMENTS

| | | |
|---|---|---|
| JP | H06236353 A | 8/1994 |
| JP | 2001517829 T2 | 10/2001 |
| JP | 2008542878 T2 | 11/2008 |
| JP | 2012243117 A2 | 12/2012 |

\* cited by examiner

INPUT/OUTPUT MEMORY MAP UNIT AND NORTHBRIDGE

CROSS REFERENCE TO RELATED APPLICATIONS

This application is a continuation of U.S. patent application Ser. No. 14/523,705, filed Oct. 24, 2017, which claims the benefit of U.S. Provisional Patent Application No. 61/896,092 filed Oct. 27, 2013, entitled INPUT/OUTPUT MEMORY MAP UNIT AND NORTHBRIDGE, the contents of which are hereby incorporated by reference herein.

FIELD OF INVENTION

The disclosed embodiments are generally directed to a memory map and translator, and in particular, to an input/output memory map unit and northbridge.

BACKGROUND

A page table is the data structure used by a virtual memory system in a computer operating system to store the mapping between virtual addresses and physical addresses. Virtual addresses are used by the accessing process, while physical addresses are used by the hardware or more specifically to the RAM.

In operating systems that use virtual memory, every process is given the impression that it is working with large, contiguous sections of memory. In reality, each process' memory may be dispersed across different areas of physical memory, or may have been moved (paged out) to another storage, typically to a hard disk.

When a process requests access to a data in its memory, it is the responsibility of the operating system to map the virtual address provided by the process to the physical address of the actual memory where that data is stored. The page table is where the operating system stores its mappings of virtual addresses to physical addresses, with each mapping also known as a page table entry (PTE).

Actions may be taken upon a virtual to physical address translation. Each translation is restarted if a TLB miss occurs, so that the lookup can occur correctly through hardware.

The CPU's memory management unit (MMU) stores a cache of recently used mappings from the operating system's page table. This is called the translation lookaside buffer (TLB), which is an associative cache.

When a virtual address needs to be translated into a physical address, the TLB is searched first. If a match is found (a TLB hit), the physical address is returned and memory access can continue. However, if there is no match (called a TLB miss), the handler will typically look up the address mapping in the page table to see whether a mapping exists (a page walk). If one exists, it is written back to the TLB (this must be done, as the hardware accesses memory through the TLB in a virtual memory system), and the faulting instruction is restarted (this may happen in parallel as well). This subsequent translation will find a TLB hit, and the memory access will continue.

The page table lookup may fail for two reasons. The first is if there is no translation available for the virtual address, meaning that virtual address is invalid. This will typically occur because of a programming error, and the operating system must take some action to deal with the problem. On modern operating systems, it will send a segmentation fault to the offending program.

The page table lookup may also fail if the page is not resident in physical memory. This will occur if the requested page has been moved out of physical memory to make room for another page. In this case the page is paged out to a secondary store located on a medium such as a hard disk drive (this secondary store, or "backing store", is often called a "swap partition" if it is a disk partition, or a swap file, "swapfile" or "page file" if it is a file). When this happens the page needs to be taken from disk and put back into physical memory. A similar mechanism is used for memory-mapped files, which are mapped to virtual memory and loaded to physical memory on demand.

When physical memory is not full this is a simple operation; the page is written back into physical memory, the page table and TLB are updated, and the instruction is restarted. However, when physical memory is full, one or more pages in physical memory will need to be paged out to make room for the requested page. The page table needs to be updated to mark that the pages that were previously in physical memory are no longer there, and to mark that the page that was on disk is now in physical memory. The TLB also needs to be updated, including removal of the paged-out page from it, and the instruction restarted. Which page to page out is the subject of page replacement algorithms. However, these algorithms fail to provide the necessary abilities that may be afforded through the use of hardware management.

ARM processors use the ACE protocol to interact with the memory subsystems. The AMD x86 memory subsystem (Northbridge) uses the CCI protocol. The ARM ACE protocol and the AMD CCI protocol are not compatible. In fact, there are a large number of differences between the protocols that need to be bridged together. Some examples include: Request, Response, and Probe/Snoop encodings; ACE protocol has writes push data into the memory subsystem and CCI protocol has the memory subsystem request write data when it is ready;—The probe/victim deadlock; ACE protocol allows processors to pass modified data copy back responsibility to the memory subsystem on a probe response and CCI does not allow this; ACE and CCI power management control signals and handshakes are substantially different; and both protocols allow the processor and the memory subsystem to operate at different clock frequencies while CCI uses a clock enable scheme to handle clock ratio throttling in the faster clock domain and ACE uses a Ready/Valid handshake. A system that can effectively bridge these two protocols is needed.

The ARM based system handles probe/snoop race conditions with CPU writebacks differently than cHT based system. In a cHT based system, the CPU required to always provide a probe response without any dependencies. If the probe hits a CPU victim, the CPU indicates if the victim has already been sent (and will later be canceled) and supplies the writeback data in a probe response. If the victim has not yet been set, its state is downgraded according to the probe type. In the ARM system, the CPU will block and not deliver the probe response until the writeback has been completed. This may occur even for probes which queued within the CPU/cluster and have not been issued yet. Therefore a problem exits where a unified northbridge may become deadlocked based on the ARM victim/probe collision handling.

SUMMARY OF EMBODIMENTS

The present invention provides for page table access and dirty bit management in hardware via a new atomic test[0] and OR and Mask.

The present invention also provides for a gasket that enables ACE to CCI translations. This gasket further provides request translation between ACE and CCI, deadlock avoidance for victim and probe collision, ARM barrier handling, and power management interactions.

The present invention also provides a solution for ARM victim/probe collision handling which deadlocks the unified northbridge. These solutions includes a dedicated writeback virtual channel, probes for IO requests using 4-hop protocol, and a WrBack Reorder Ability in MCT where victims update older requests with data as they pass the requests.

BRIEF DESCRIPTION OF THE DRAWINGS

A more detailed understanding may be had from the following description, given by way of example in conjunction with the accompanying drawings wherein.

DETAILED DESCRIPTION

The present invention provides for page table access and dirty bit management in hardware via a new atomic test[0] and OR and Mask. The present invention also provides for a gasket that enables ACE to CCI translations. This gasket further provides request translation between ACE and CCI, deadlock avoidance for victim and probe collision, ARM barrier handling, and power management interactions. The present invention also provides a solution for ARM victim/probe collision handling which deadlocks the unified northbridge. These solutions includes a dedicated writeback virtual channel, probes for IO requests using 4-hop protocol, and a WrBack Reorder Ability in MCT where victims update older requests with data as they pass the requests.

Figure 1:
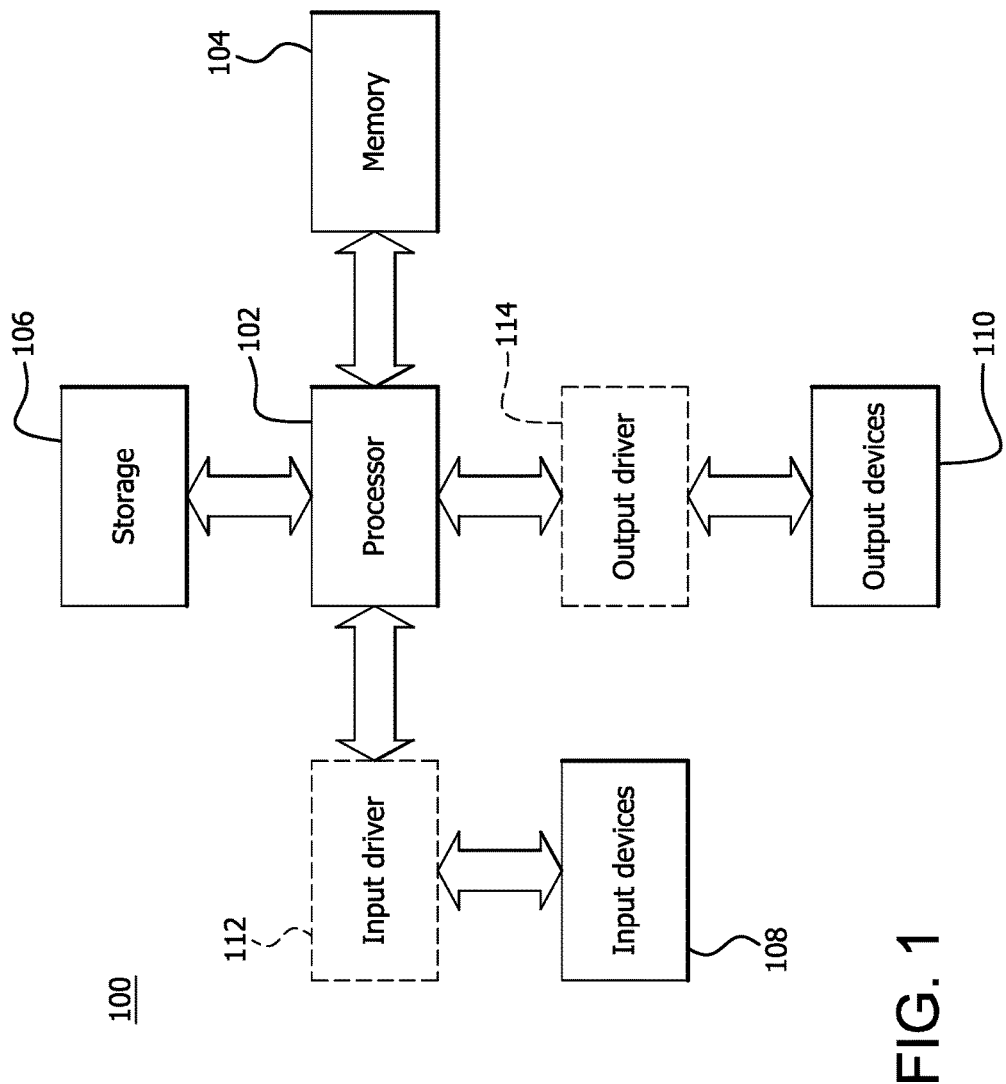
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU 102), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory 104, for example, random access memory 104 (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless I4E 802 signals). The output devices 110 may include a display, a speaker, a printer, a haptic feedback device, one or more lights, an antenna, or a network connection (e.g., a wireless local area network card for transmission and/or reception of wireless I4E 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

In accessing table entries in a page table, hardware may set the access bit to 1. Test[0]andOR atomic (or Test[0] SetandClr with Op2 being all 1s) may be used and may be enabled by registers. A dirty bit mechanism may be beneficial. For example, when request require write permission but AP[2] is 1′b1, the hardware may check the DBM bit (bit 51 of the last page table descriptor) and set AP[2] to 1′b0 if the dirty bit is set to 1′b1. Test[0]SetandClr atomic.Test[0] Set and Clr: (Both 32 b and 64 b versions of this atomic op are supported) may be used in this step.

For example, the following operation may be used as a function in hardware to manage page tables.

$$Mem[Addr]=Mem[Addr][0]?((Mem[Addr]|Op1)\&Op2):Mem[Addr]; \quad \text{Equation 1}$$

Equation 1 provides that to modify memory 1 (Mem[Addr]), if bit 0=test bit that if set perform the operation, otherwise do nothing (Mem[Addr][0]). The operation is the operands Op1 and Op2 operating on the memory address. For example, the memory address may be set and cleared in ADDR based on Op1 and Op2. This provides a function in hardware to manage page table.

The dirty bit mechanism may be enabled if the access bit mechanism is also enabled. With dirty bit mechanism in place, equation 2 allows AP[2] to indicate whether the page is dirty or clean through:

$$AP[2]=1\text{-page clean}:AP[2]=0\text{-page dirty} \quad \text{Equation 2}$$

Both the access bit and the AP[2] bit may be updates from the same block/page translation table entry in a single Test[0]SetandClr atomic operation.

Using hardware to manage the access flag may be beneficial. For example, for the Secure and Non-secure PL1&0 stage 1 translations, an implementation may provide hardware management of the access flag. In this case, if a translation table entry with the access flag set to 0 is read into the translation lookaside buffer (TLB), the hardware writes 1 to the access flag bit of the translation table entry in memory. An implementation that provides hardware management of the access flag for the Secure and Non-secure PL1&0 stage 1 translations: may use the hardware Access flag field, ID_MMFR2[31:28], to indicate this implementation choice; may implement the SCTLR.HA bit by setting the bit to 1 to enable hardware management of the access flag.

When using the Short-descriptor translation table format, hardware management of the access flag is performed if both SCTLR.AFE is set to 1, to enable use of an access flag, and SCTLR.HA is set to 1, to enable hardware management of the access flag. The Banking of SCTLR enables the bits to be defined independently for the secure and non-secure address translations allowing for a different decision for secure/nonsecure bits. When hardware management of the access flag, is enabled for a stage of address translation, no access flag faults are generated for the corresponding translations. This permits an update in one atomic update and cannot occur if not managed in hardware.

The present invention relates to embodiments of a "gasket" which will sit in the central processing unit (CPU 102) clock domain between the synchronizer and the core cluster. There the gasket may provide translation of transactions into cache coherent interconnect (CCI) transaction and system probes into snoops. In addition, the gasket may translate the memory map, transfer sizes, and other functions necessary for the core cluster to inter-operate with the unified northbridge (UNB)/coherent HyperTransport (cHT) environment.

Figure 2:
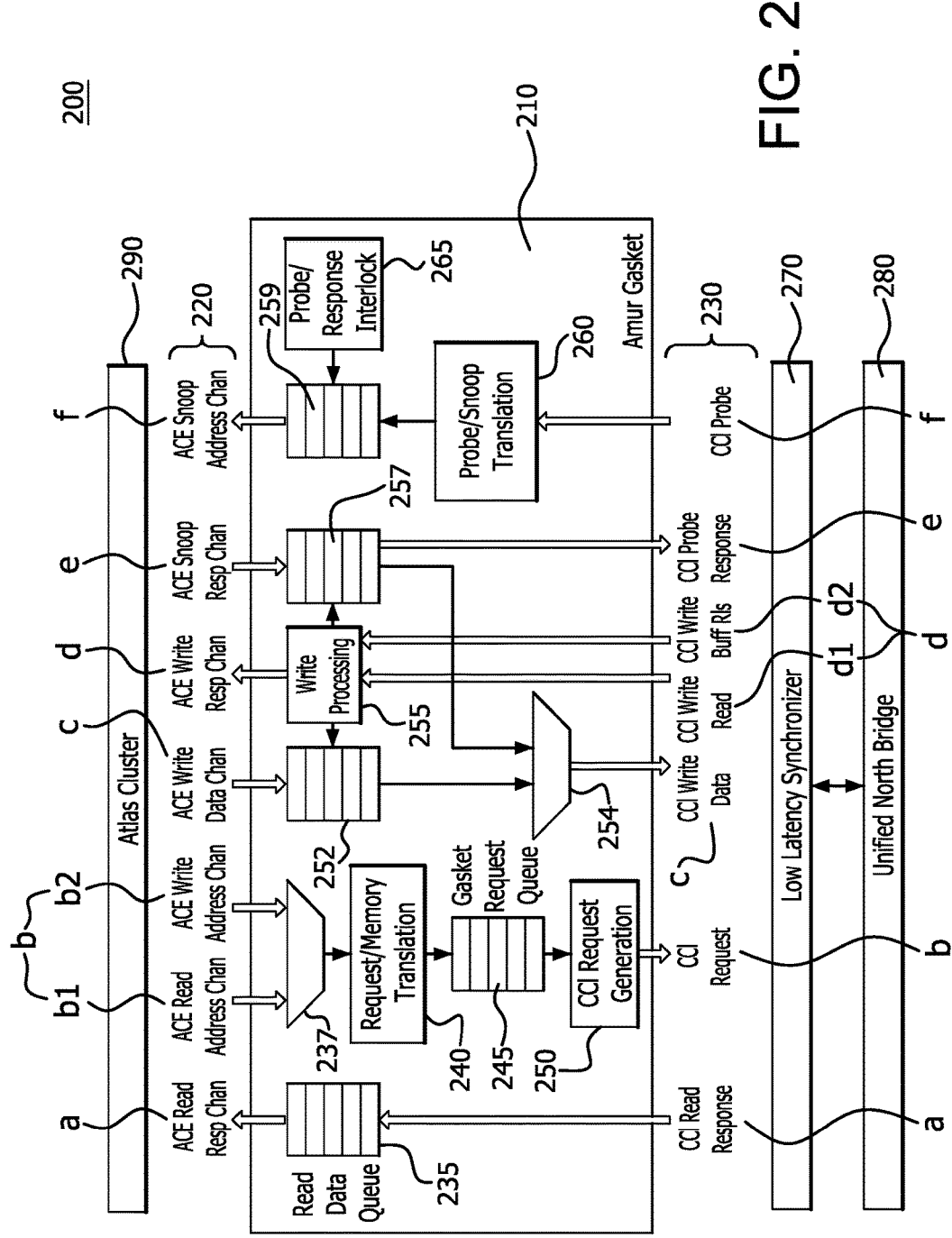
FIG. 2 illustrates an exemplary system including a gasket for providing translations of transactions between a unified northbridge and an atlas cluster.

Referring to FIG. 2, there is shown an exemplary system 200 including a gasket 210 for providing translations of transactions between unified northbridge 280 and atlas cluster 290. As shown in FIG. 2 atlas cluster 290 may include a number of channels 220 in an atlas bus interface. These channels 220 may include ACE read response channel 220a, ACE read address channel 220b1, ACE write address channel 220b2, ACE write data channel 220c, ACE write response channel 220d, ACE snoop response channel 220e, and ACE snoop address channel 220f. Using the gasket 210 each of the atlas cluster 290 channels 220 may be translated to the unified northbridge 280 via CCI 230. For example, channel 220a may be translated to CCI read response 230a, channel 220b1 and 220b2, collectively 220b, may be translated to CCI request 230b, channel 220c may be translated to CCI write data 230c, channel 220d may be translated to CCI write read 230d1 and CCI write buffer release 230d2, collectively 230d, channel 220e may be translated to CCI probe response 230e, and channel 220f may be translated to CCI probe 230f.

A low latency synchronizer 270 may be used from CCI bus 230 to unified northbridge 280 as will be described further herein.

Requests from the CPU 102 need to be translated from Advanced eXtensible Interface (AXI) coherency extension (ACE) commands into the equivalent CCI commands. In general, each ARM request type maps onto a specific CCI request type. The ARM command type is encoded in the AxDomain and AxSnoop fields of the read and write address channels. Within gasket 210 the specific translation may take a number of different forms. For example in translating from CCI read response 230a to ACE read response channel 220a, a read data queue 235 may be implemented.

In translating from ACE read address channel 220b1 and ACE write address channel 220b2 may be combined such as by using multiplexor 237 and then input into request/ memory translator 240 through gasket request queue 245 to CCI request generator 250 to CCI request 230b.

In translating from CCI probe 230f the gasket contains probe/snoop translator 260 that outputs to queue 259, which also receives as input information from probe/response interlock 265, to output on ACE snoop address channel 220f.

In translating from CCI write data and CCI read data 230d to ACE write response channel 220d, a write processor 255 within gasket 210 may be used. ACE snoop response channel 220e inputs into queue 257, which provides data to multiplexor 254 and outputs to CCI probe response 230e, while receiving input from write processor 255. ACE write data channel 220c inputs to queue 252, which outputs to multiplexor 254, while receiving input from write processor 255. Multiplexor 254 outputs to CCI write data 230c.

The following translations shown in Table 1 may be used.

TABLE 1

| | CCI Transaction | | | | | | |
|---|---|---|---|---|---|---|---|
| ACE Transaction | RdBype | RdDword | WrByte | WrDword | RdBlk | RdBlkS | RdBlkM |
| ReadOnce | | Y | | | X | X | X |
| ReadClean | | | | | X | Y | |
| ReadNotSharedDirty | | | | | Y | X | X |
| ReadShared | | | | | Y | X | X |
| ReadUnique | | | | | | | Y |
| CleanInvalid | | | | | | | |
| MakeInvalid | | | | | | | |
| CleanShared | | | | | | | |
| ReadNoSnoop | | Y | | | | | |
| CleanUnique | | | | | | | |
| MakeUnique | | | | | | | |
| WriteNoSnoop | | | | Y | | | |
| WriteUnique | | | Y | Y | | | |
| WriteLineUnique | | | | Y | | | |
| WriteBack | | | | | | | |
| WriteClean | | | | | | | |
| Evict | | | | | | | |

| | CCI Transaction | | | | | | |
|---|---|---|---|---|---|---|---|
| ACE Transaction | ApicWr | Alloc | WrVlcBlk | CiVlcBlk | CtoD | Lock | Ciflush |
| ReadOnce | | | | | | | |
| ReadClean | | | | | | | |
| ReadNotSharedDirty | | | | | | | |
| ReadShared | | | | | | | |

TABLE 1-continued

| | | | | |
|---|---|---|---|---|
| ReadUnique | | | | Y |
| CleanInvalid | | | | |
| MakeInvalid | Y | | | X |
| CleanShared | | | | Y |
| ReadNoSnoop | | | | |
| CleanUnique | | | X | Y |
| MakeUnique | Y | | | X |
| WriteNoSnoop | | | | |
| WriteUnique | | | | |
| WriteLineUnique | | | | |
| WriteBack | | Y | | |
| WriteClean | | Y | | |
| Evict | | | Y | |

X --> Preferred Xlate
Y --> Alternate Xlate

In Table 1 there is shown the translations that may be performed in path a of FIG. 2. The ACE translation is shown on the left hand side of the table and the CCI translation is shown at the top. The preferred translation is shown with an 'X' and alternative translations are shown with a 'Y'.

The bus connections may support an address up to bit 43, while CCI supports addresses up through bit 47. In addition, the processor may not use the full address space so one or more of the upper 4 bits may be unused and may be assumed to be zero. These otherwise undriven upper bits may be driven to zero, or overloaded to carry ACE attributes.

Currently defined overloads include Bit [44] will carry AxPROT[1] which indicates "Secure" or "Non-secure" access (0 or 1, respectively). This is used by the generic interrupt controller (GIC) for banked register accesses. This bit may be zeroed by SRI logic before forwarding to any other destinations.

In addition to translating the requests as described, gasket 210 may or may not be required to translate ACE tags into CCI tags. If ACE tag space fits within the CCI tag space, then the tags may be passed through gasket 210 unchanged. Although the ACE protocol does allow reuse of the same tag in order to indicate that two or more transaction be kept in order, the unified northbridge 280 generally does not maintain ordering. As a result, ACE requests sharing the same tag/id may be serialized within gasket 210 which prevents transactions with duplicate tags from reaching unified northbridge 280.

A consolidated table of request/probe combinations is provided in Table 2.

TABLE 2

| | Transaction/Snoop | State Change | Required/Alternate Snoops | | | |
|---|---|---|---|---|---|---|
| | | | ReadOnce | ReadClean | ReadNotSharedDirty | ReadShared |
| Permitted Snoops | ReadOnce | None | Y | X | X | X |
| | ReadClean | Shared/Invalid | | Y | X | X |
| | ReadNotSharedDirt | Shared/Invalid | | X | Y | X |
| | ReadShared | Shared/Invalid | | X | X | Y |
| | ReadUnique | Invalid | | | | |
| | CleanInvalid | Invalid | | | | |
| | MakeInvalid | Invalid | | | | |
| | CleanShared | Clean/Invalid | | | | |
| Forbidden Snoops | ReadNoSnoop | None | | Not Snooped | | |
| | CleanUnique | Invalid | | | | |
| | MakeUnique | Invalid | | | | |
| | WriteNoSnoop | None | | Not Snooped | | |
| | WriteUnique | Invalid | | | | |
| | WriteLineUnique | Invalid | | | | |
| | WriteBack | None | | Not Snooped | | |
| | WriteClean | None | | Not Snooped | | |
| | Evict | None | | Not Snooped | | |

| | Transaction/Snoop | Required/Alternate Snoops | | | |
|---|---|---|---|---|---|
| | | ReadUnique | CleanInvalid | MakeInvalid | CleanShared |
| Permitted Snoops | ReadOnce | X | X | | X |
| | ReadClean | X | X | | |
| | ReadNotSharedDirt | X | X | | |
| | ReadShared | X | X | | |
| | ReadUnique | Y | X | | |
| | CleanInvalid | X | Y | | |
| | MakeInvalid | | | Y | |
| | CleanShared | X | X | | Y |

TABLE 2-continued

| | | | |
|---|---|---|---|
| Forbidden Snoops | ReadNoSnoop | | Not Snooped |
| | CleanUnique | X | Y |
| | MakeUnique | | Y |
| | WriteNoSnoop | | Not Snooped |
| | WriteUnique | X | Y |
| | WriteLineUnique | | Y |
| | WriteBack | | Not Snooped |
| | WriteClean | | Not Snooped |
| | Evict | | Not Snooped |

X --> Preferred Xlate
Y--> Alternate Xlate

In Table 2 there is shown a consolidated table of request/probe combinations. These may include ARM transaction that ID snoops that are generated. The boxes marked with an 'X' are preferred while the boxes marked with a 'Y' are alternate snoops.

CCI encoded probes 230f may be translated into the equivalent ACE snoop transaction via probe/snoop translator 260. The ACE protocol uses a combination of normal read commands and dedicated cache maintenance commands on the snoop channel. The translations of Table 3 may be used.

TABLE 3

| CCI Probe | ReadOnce | ReadClean | ReadNotSharedDirty | ReadShared | ReadUnique | CleanInvalid | MakeInvalid | CleanShared |
|---|---|---|---|---|---|---|---|---|
| NoChng | X | | | | | | | |
| Shared | | | | X | | | | |
| Invalidate | | | | | | X | | |
| Downgrade | | | | | | | | X |
| Migrate | | | | | | | | |
| Neighbor | | | | | | | | |
| Reserved1 | | | | | | | | |
| Reserved2 | | | | | | | | |
| Provide Dirty | Y | Y | Y | Y | Y | Y | N* | Y |
| Update DRAM | N | N* | N* | N | N | Y | N* | Y |
| Retained States | S | ES | MES | MOES | ME | I | I | ES |

Table 3 provides translations that may be used. The translations define CCI probe generation specifics based on ACE snoop.

In the case where a single CPU 102 cluster is used, the probes received by gasket 210 may be a result of IO/graphics processing unit (GPU) requests which limits to the cases above.

When gasket 210 receives a read response 230a from the CCI interface, it needs to generate an equivalent response on the ACE bus 220a to cluster 290. In certain circumstances, gasket 210 may delay starting the ACE response 220a until all beats of data have been received on from the CCI interface 230a. There are some situations identified as needing this. The burst orders may be different. RdBlkX transactions provide data in the wrapping burst order expected by ACE bus 220. Error Checking and Correction (ECC) errors may result in a replay of a response (i.e. the CCI read data may be incomplete).

The system memory 104 map must be used to identify DRAM vs. IO for purposes such as interrupt controller decode, etc. The ARM environment uses the ARM memory map to distinguish DRAM from non-DRAM addresses and to further sub-divide the non-DRAM space. The cHT environment uses explicit I/O and other signals to indicate address region types. Gasket 210 may use a memory map to create the expected auxiliary address type signals to be sent with each request to SRI. The memory map may be used to translate the ARM transactions into cHT. Address base registers include GIC Base Address Register (for setting ReqIo and ReqApic), Extended Config Base (for setting ReqExtCfg), and DRAM Base (for setting ReqNonCache).

The ARM based system handles probe/snoop race conditions with CPU 102 writebacks differently than cHT based system. In a cHT based system, the CPU 102 required to always provide a probe response without any dependencies. If the probe hits a CPU 102 victim, the CPU 102 indicates if the victim has already been sent (and will later be canceled) and supplies the writeback data in a probe response. If the victim has not yet been set, its state is downgraded according to the probe type. In the ARM system, the CPU 102 will block and not deliver the probe response until the writeback has been completed. This may occur even for probes which queued within the CPU 102/cluster and have not been issued yet.

To avoid deadlock with an ARM processor, the writebacks may have access to an independent virtual channel that allows the writebacks to drain to DRAM. Within MCT, these writebacks may have to pass older reads to the same address which they normally may have been dependent on. The specific changes that are required to implement this are non-blocking path for writebacks to traverse gasket 210, non-blocking path for writebacks to traverse SRQ, and non-blocking path through the cross-bar. When arriving in MCT, the writeback does not need to establish a dependency on earlier requests, but rather be allowed to pass. In addition, the oldest read may be marked dependent on the writeback, and forced to reissue any DRAM read operation that is has already issued, after the writeback completes.

An earlier read may be "interrupted" by an arriving writeback to the same address, if its probes have not completed, or source done been received. If the read response has been issued to the source and the writeback arrives, it may not be possible to tell if the probe will be responded to or not. It is possible that the CPU 102 has given a probe response and then the writeback was issued. However, in this case, the source may have received a probe response with data. If that occurs, then the response may not need to be reissued. The MCT may not be able to anticipate this. If MCT has reordered the writeback and reissued the read to DRAM, the MCT may have to reissue the response with the new data. As long as the response is resent before/with target done, the new data will overwrite any prior response.

There is another potential deadlock scenario where gasket 210 as well as the path to memory 104 is full such the CPU 102 cannot issue a writeback. If a probe were received that matched a yet to be issued writeback (buffered internally) and the CPU 102 stalled the probe, a deadlock may occur even if the writebacks have their own virtual channel. The CPU 102/cluster avoids this situation by not interleaving writebacks and non-writeback writes. Therefore, if there is a probe dependency on an unissued writeback, then writeback type writes can exist in the gasket 210 and these writebacks may drain, allowing the blocking writeback to be issue (and drain). If there are nonwriteback writes which have been issued, then the cluster may not generate any writebacks (even unissued writebacks) upon which a probe could dependent.

Gasket 210 may need to observe synchronizer 270 skip clock logic for driving and receiving signals from synchronizer 270 including using the predicted FIFO enables to ensure that write command to write data valid obeys the 5-clock separation expected by the SRI in unified northbridge 280 domain. Incoming responses may also obey the 5 clock separation. Gasket 210 may forward responses to the CPU 102 with the ACE timing. Synchronizer 270 provides a signal which indicates whether synchronizer 270 FIFO is enabled for reading/writing 10 clocks later. There is a separate signal to enable reading and writing. The logic in the driving domain may send signals to synchronizer 270 such that the required timing relationships are observed when the signals are received at the output of synchronizer 270. In the case of write data, this means that gasket 210 must drive CPU_NbDat 5 enabled clocks after CPU_NbDatVal to be observed by unified northbridge 280 with the proper relationship. Similarly, gasket 210 should expect to sample valid read data on NB_SysDat exactly 5 enabled clocks after NB_SysDatVal assertion.

ARM writes have more flexibility in size and/or byte combinations than CCI allows. Therefore, it is possible that certain ACE writes may be broken into multiple CCI writes. The request queue 245 and/or write buffer may need to track the specific bytes that need to be transferred and generate appropriate commands, only deallocating the entry and buffer when all "sub-writes" have completed and been released.

CCI/cHT provides byte enables in line with the data stream as a prefix data beat. All of the byte enable information for the remaining data beats is provided in a single prefix data beat. The byte enables are interpreted in the context of the address and count fields.

The supported size description includes doubleword (4-byte) operations that transfer any number of contiguous complete double words within a 64-byte aligned block. The Count Field encodes the number of double word data elements that may be transferred, beginning at the specified address, and going in ascending order. Count codes of 0 through 15 represent 1 through 16 data elements to be transferred, respectively. Requests that cross a 64-byte boundary may be broken into multiple transactions, issued in ascending address order.

Byte writes may transfer any combination of bytes within a naturally aligned 32-byte address region. Transfers that cross an aligned 32-byte boundary may be broken into multiple HyperTransport transactions, issued in ascending address order.

CPU_CMD_WRBYTE: 5'b01010—Non-cacheable write of 1 to 32, potentially non-contiguous bytes, within an aligned 32 bytes block. Writes 1 or 2 data beats. If the least significant byte accessed is in bytes 4 through 7, then ReqAddr[2]=1

CPU_CMD_WRDWORD: 5'b01011—Non-cacheable write of 1 to 16 contiguous double words within a 64 byte block. Writes 1 to 4 beats.

The ACE protocol provides byte enables along with each beat of data. The byte enables apply to the corresponding data bytes independent of the address or length information. For any "sized" ACE writes, any combination of byte enables is allowed. As a result, byte writes (non-contiguous, non-dword aligned, or non-dword multiple sized), may span a 32-byte boundary and require multiple transfers. Any ACE write may be converted to at most 2 CCI type byte writes.

Write combining within the CPU 102/cluster may result in 16 byte transfers. Even if multiple CPU 102 16 byte writes are combined, the resulting buffer can always be converted to a single CCI DWORD write. Any time a write is received with any byte strobes disabled, that buffer may be flushed immediately with a single byte write transaction and all other buffers, whether combining multiple writes or not, may be written with a single DWORD write.

The processor core described herein provides some degree of write combining, but the processor may only be able to combine 16 bytes of write data. For some applications, there may be considerable benefit for combining writes up to a full cache line. The number of write buffers implemented in gasket 210 may be less that the number of write request entries. The write data may only be held until it is pulled from the buffer by the SRI, while the write request needs to remain until the response is able to be sent to the CPU 102 (which is after the SRI buffer release based off target done). Some, or all of these, write buffers may have write combining cap ability.

Adding write combining capability requires flushing the buffer. There are several possible algorithms and it may be necessary to implement multiple of them, either as configurable modes, or in parallel. Possible Buffer Flush Triggers include: any time the buffer because completely valid—mandatory flush; any time the unsent buffers are exhausted—mandatory flush; any time a CPU 102 write does not hit a buffer already open to that CPU 102; any time a programmed limit to the number of open buffers is reached; and other heuristics which indicate a buffer is no longer being written. Restrictions to Buffer Flush may include when only can combine writes with the correct cache ability attributes (bufferable), need to flush all buffers for barriers and in some embodiments, there may be a need to flush all buffers for DvmSync.

Barrier transactions may be used to provide certain ordering guarantees which the ARM programming/consistency model does not otherwise provide. The ACE protocol provides for separate read and write transaction channels, and therefore, barrier transactions may be issued as a read/write pair. Once both transactions have completed, it is safe to assume that transactions issued after the barrier may be ordered after transactions prior to the barrier. The ACE protocol defines two types of barriers: memory and synchronization.

A memory barrier may be issued by a master to guarantee that if another master in the appropriate domain can observe any transaction issued after the barrier it must be able to observe every transaction issued before the barrier. A memory barrier may be used for memory based communication. For example, when writing an array of data to memory 104, a master component may issue a memory barrier before setting a memory flag to indicate that the array is available. Any other master component that can observe the flag must observe the transactions that write to the array.

A synchronization barrier may be issued by a master to guarantee that the transactions issued before the barrier are observable by every master in the appropriate domain when the barrier completes. System domain synchronization barriers have the additional requirement that the transactions issued before the barrier transaction must have reached the endpoint slaves they are destined for before the barrier completes. A synchronization barrier may be used with various forms of side-band signaling communication. For example, when writing an array of data to memory 104, a master component may use a synchronization barrier before generating an interrupt to indicate that the array is available. When the synchronization barrier completes, the updated array is guaranteed to be observable by all master components in the domain.

The cHT protocol provides for write ordering such that observation of a later write implies observation of early writes. There need not be any distinction between the handling of the memory and synchronization barrier instructions. Both may be handled entirely within gasket 210 by simply ensuring that all earlier requests have been issued by gasket 210 to the SRI before indicating completion to the CPU 102. Once the older requests have been issued (or, more conservatively, completed), gasket 210 may send the response for the barrier transaction back to the CPU 102.

ACE provides ARPROT[2:0] and AWPROT[2:0] to provide access permissions on the read and write request channels. These bits are defined as follows:
AxPROT[0]:0/1—Unprivileged/Privileged access;
AxPROT[1]:0/1—Secure/Non-secure access; and
AxPROT[2]:0/1—Data/Instruction access.

Only the Unprivileged/Privileged bit is passed through to SRI. This is necessary as the SRI is planned to provide the programming interface to the GIC distributor and some registers are banked based on the privilege level when supporting virtualization. Since the address unified northbridge 280 supported address space is larger than that of the core, the upper address bits may be overloaded with the privilege indicator and to do the same for any additional access permission bits that may need to be forwarded.

Gasket 210 will have some degree of participation in power management operation. Gasket 210 may interact by: implementing the required CAC registers which count various events provided by the cluster; and providing a "Quiesce" function for changing power management states. Gasket 210 may interact to block further CCI requests by requesting power management via an input signal, waiting for outstanding CCI requests to complete, and then driving an output signal to indicate that the interface is idle.

For power management purposes, the cycle count may be weighted based on frequency. The cluster does not have access to frequency information. The frequency is set by the unified northbridge 280 as a result of software programming a register with the desired P-state. The power management software (the PEP) may signal the SMU to update the weights in gasket 210 each time a frequency change occurs. Alternatively, the P-state frequency table may be replicated in gasket 210 and an update write of the current P-state may be observed by gasket 210 and the weights updated transparently.

In order to not be limited by the methods above, some number of counters may be supplied to be programmed to count any of the PMU Event signals that are considered interesting. Each counter may be programmed to indicate which of the PMU Events, the bus read/write indications, or clock events are to be counted. For example, a configuration where the cycle count with the wait for event/interrupt (WFE/WFI) signals to count active cycles. The POR and SMU may provide weights for each of these counters.

Power management interfaces with software and the interrupt controller. In one implementation, the software component is microcode and the interrupt controller is APIC. In the ARM architecture, there's no provision for implementing microcode, and the interrupt controller is the GIC.

Power management is implementation specific. The particular hardware in a SOC is not visible to the OS. The OS accesses power management hardware via specifically defined interfaces that each implementation hides behind vendor specific software. C-states and P-states are advertised to the OS via ACPI calls, and the OS makes requests that are trapped and handled by the microcode. In ARM, this layer of code may be supplied to both Windows and Android. On Windows RT, this code is known is the Platform Engine Plugin (PEP) and in Android, the power management driver code may be compiled directly into the kernel. These come in the form of CPUidle for C-states and CPUfreq for P-state changes. The interface to power management hardware may be done in PEP or kernel driver, similar to the ucode interface. For simplicity, reference will be provided to the Android kernel drivers while describing the ARM implementation. The PEP, while named and organized differently in the OS software stack, fulfills the same role of abstracting the microarchitecture to the OS as Android kernel driver or microcode. One could take the Android power management kernel driver architecture and apply it to Microsoft platform based on the description herein.

Unlike microcode (ucode) or kernel driver interface to power management hardware, the APIC or GIC is architecturally visible to the OS. The SOC hardware may implement the interrupt controller corresponding to architecture. Therefore, common power management hardware may accommodate both interfaces.

The GIC v2 specification may be implemented. Unlike the GIC v3, the legacy GIC-400 implements both distribution and delivery (CPU 102 interface) in one component hardwired to support up to 8 cores. The output of the CPU 102 interface is the FIQ/IRQ pins per-core and virtualized counterparts. This architecture is similar to the APIC, and the edges may be masked using both software (CC_INT_MASK) and hardware, along with generating a wake up request to exit C-states.

Power management flows require software support. Interrupts are first intercepted by the ucode, which services these uarch interrupts internally and then forwards the architecturally visible ones to the OS. The uarch interrupts include stop clock (StpClk) and start clock (StartClk). Since ARM cores do not implement ucode and GIC interrupts are visible to the OS. To support StpClk and StartClk on ARM, vendor specific interrupt handlers may be registered for unified northbridge 280, which may be treated as a device by the OS.

APIC interrupt delivery may be done either by remote writes (for external interrupts) or via local interrupt pins. An example of a local interrupt is APIC330, which is used to signify to the OS that its requested performance state has been throttled or restored due to thermal events. GIC interrupt delivery is both through its AXI interface to the data fabric, which functions similar to APIC remote writes, and via local interrupt pins in the form of the shared peripheral interrupt (SPI) or the private peripheral interrupt (PPI). Each SPI may be programmed to target a single core. By using the SPIs, unified northbridge 280 does not have to generate an AXI message into the fabric and to the GIC to request the interrupt. In the case of APIC330, a single SPI id may be taken. For interrupts that target multiple cores, such as StpClk, StartClk, DbReq, and DbReq2, the unified northbridge 280 may reserve one SPI id per core per interrupt type and require SW configuration to target the core(s). If there are only four cores, by implementing StpClk, StartClk, and the DbReqs, up 16 SPIs may be used.

An alternative is to hook unified northbridge 280 multi-target interrupt types to the nLEGACYIRQ[n]/nLEGACYFIQ[n] pins, which are made available as PPIs to the GIC-400. A status register may be supplied for the interrupt handler to determine the sub-type encoded to the same pin. This may require that interrupts sharing the legacy pins may have to share the same priority, but StpClk, StartClk, and DbReqs may be set to the highest priority anyway.

Currently, APIC drives an interrupt edge to nbcor 440, e.g. NBAPC_Intr, which then sets a level interrupt pin to the core, e.g. NBCOR_IntrEdge. The ucode then clears it via SprClrint (F3xB4) when servicing. GIC v2 may drive the level pins, e.g. IRQ/FIQ, to nbcor 440, but these may instead be cleared in GIC 410 itself after the core acknowledges the interrupt. This minimizes the need to implement SprClrint for architecturally defined GIC 410 pins. The IRQ/FIQ pins in nbcor 440 may be flopped and used as an IntrEdge, which is to trigger wakeup, etc.

Existing uArch interrupts are now driven into GIC 410 and come out on FIQ. There is no longer a need to also implement level interrupt pins in nbcor 440 for most of these interrupts, including StpClkEdge, StartClkEdge, and DbReqEdge. Existing pins may be converted from level to edge and retargeted from nb->core to nb->GIC. There's no reason for the interrupt handlers to clear two separate level interrupt states. The only level indication that gets used out of the three above is StartClkEdge, which is used to swap between normal and isoc hysteresis counters. The usage is only to delay swap until the StartClk is taken, and the scenario that happens is around C1e, which we should be able to safely ignore. The only exception is DbReq, which uses its level indication to generate a cancel, so we need the SW to signal via SprClrint to indicate that DbReq2 is taken and thus avoid cancel beyond that point. This is in addition to clearing the FIQ edge for DbReq2.

Currently, unified northbridge 280 C-state is exited on InbWake, which covers external interrupts. For locally sourced interrupts that also need to wake up the core, the types that they could map to from APIC IntrEdge and DbReq may be keyed off. For GIC, the local interrupts may be accounted for. If local SPI inputs to the GIC are on free running clock, then it may be assumed that the local inputs will make it out on FIQ/IRQ, or the error or virtualization counterparts, so we'd simply remap to idle exit. If the inputs travel through gated logic before getting to the GIC, then the source of these interrupts may go to idle exit.

On x86/ACPI, upon hitting processor idle, the OS requests halt via a halt instruction or an IO read after setting a C-state offset advertised by the ACPI. The halt or the IO read is trapped into microcode, which then issues a halt special broadcast cycle (SBC) to unified northbridge 280, waits for the fabric to quiesce, and then deasserts the ConnectMask sideband. The SBC from the last core entering C-state results in a downstream system management command to the FCH to signal the start of C-state on all cores. This may also be used to drive monitors that govern upgrades to deeper C-states. The ConnectMask sideband is used to initiate power management.

On ARM/Android, the OS calls a supplied CPUidle kernel driver code via its predefined API. CPUidle may then issue the halt SBC to the NB via its memory 104 mapped address. On x86, this is mapped to the FDF91 base. This is hardcoded in unified northbridge 280, so an ARM core may need to be able to generate memory 104 requests to that address. This satisfies FCH communication as well as monitor training. CPUidle then issues a WFI instruction, which asserts the STANDBYWFI sideband. STANDBYWFI is inverted and then treated as ConnectMask internally inside unified northbridge 280.

On certain cores, seeing ConnectMask may deassert while in halt or HTC SBC (for P-states) may initiate the hardware to prepare the data fabric for an imminent clocking request to CK. Before proceeding to the actual clocking request generation the following may be completed:

1. Block probe issue to all cores and drain all pending probes from the affected core(s) by waiting for their probe responses and/or data movements to complete. This does not apply if the CPC is all flushed.

2. Wait for the affected core(s) to drop their NbBusy, which are cores' objections to low power state, e.g. while scrubbing.

3. Unconditionally wait enough time to cover a roundtrip delay to the NBSYN FIFOs so that new events triggered by inflight traffic in the FIFOs may have enough time to raise objection.

4. Block and wait for pending APM requests on the Cac interface to be responded or acked.

5. Satisfy hysteresis for power down. Hysteresis is implemented for both probe arrival rate (normal) and inter-request probe gap (isoc). Does not apply if the CPC is all flushed.

Power management may also be disabled in presence of ConnectMask deassertion. Setting the clock divisor to div-1 with EnaCPUDiv1LowPwr?=0 may skip low power entry and not result in a clocking request to CK.

Unified northbridge 280 may generate the following clocking request types to CK: Core clock gated with probe enabled (referred as probe-able CC1); Core clock gated with probe disabled (referred as non-probe-able CC1); Core clock gated with cache flushed (referred as cache-flush-on-halt CFOH); and Retention mode (RCC3).

For the Core clock gated with probe enabled (referred as probe-able CC1), the CK may deassert all clock gates to the targeted core, and then re-enable the gates associated with probes. Note that the L2 ignores the probe gate reenable, leaves the core off, and performs its own clock ramp up/down in presence of probes. Another core may clock gate itself upon sending a WFI and does not need further clock gating by the CK. CC1 may be implemented on a core as simply power management disabled by setting the CCR to div-1 with EnaCPUDiv1LowPwr?=0.

For the Core clock gated with probe disabled (referred as non-probe-able CC1), this is the same as the probe-able case, except the probe gates are not reenabled. This mode is not used in some cores and only exists as a chicken bit. In presence of probes, power management is required to request C-state exit and reentry, with the preparation logic guaranteeing hysteresis.

For the Core clock gated with cache flushed (referred as cache-flush-on-halt CFOH), this mode allows residence in a clock gated state with probes disabled and without ramp up to service incoming probes. This mode is only beneficial when the whole CPC has been flushed.

For the retention mode (RCC3), this is a deeper version of the non-probe-able CC1 state where the core voltage is reduced by adjusting the power gating (PG) headers and maintaining that voltage via a feedback circuit. The latency characteristics are very similar to the non-probe-able CC1 state but with more power savings. RCC3 may be applied with or without flushing, where flushing makes it a better CFOH mode.

Some cores may implement this mode, requiring a Q-channel handshake with its power controller to allow retention mode. Without doing this handshake, the cluster automatically clock gates a core and automatically ramps clocks to service probes and to exit from WFI on interrupt without fabric intervention. After doing this handshake, the cluster may rely on completing the handshake to allow exit from low power state to complete either task. Retention mode is entered/exited under the control of the power controller in the fabric when allowed by the handshake. Thus, on WFI, the cluster may first assert STANDBYWFI and gate off its clock. Sometime later, it will deassert CPUQACTIVE to indicate that retention handshake is permitted. Power controller may assert CPUQREQ to request retention. The cluster may then grant or deny retention through a third part of the three-way handshake by asserting CPUQACCEPT or CPUQDENY. Prior to that, an interrupt automatically awakens the core and if in handshake, results in CPUQDENY. After seeing CPUQACCEPT, retention entry is considered committed and the cluster may rely on the power controller to exit retention and then deassert CPUQACCEPT before exiting clock gating or WFI.

Core C-state commit point is SetCPULowPwr in unified northbridge 280. To support this feature, the handshake may need to be completed. The best place to trigger handshake initiation is on CPULowPwrReq assertion, which accounts for STANDBYWFI assertion, and then blocks VceLowPwrRdy until CPUQACCEPT assertion, which guarantees the core has committed.

GIC-400 exposes incoming interrupts directly on FIQ/IRQ pins from the CPU 102 interface. These interrupts may be masked from the core by PwrMgtOrStpGntCC6MaskIntCPU, which covers a core's residence in RCC3 (or in CC6). The FIQ/IRQ edges may be used to create a wakeup event (CoreWakeUpInt) using existing logic to clear IobcOrHalt, which may then trigger an exit from RCC3. Once exit is complete, PwrMgtOrStpGntCC6MaskIntCPU may deassert and all interrupts may be delivered. Interrupt delivery may trigger CPUQACTIVE to deassert, and unified northbridge 280 may then finish off the retention handshake by deasserting CPUQREQ.

CPUQACTIVE may be deasserted on probes targeted to the core in retention, however RCC3 may be enabled after cache flush, so that probes are not a wake up condition. The L2 implements a snoop filter for L1 where l2_snp_active wakes up ck_CPU_logic. This means an L1 flushed core may not see probes from the L2, which should guarantee no retention exit on incoming system probes.

The core additionally deasserts CPUQACTIVE on receiving distributed virtual memory 104 (DVM) operations. DVM operations include TLB shoot-down, BTB invalidation, and i-cache invalidations and require a core's participation in the protocol, unless the core has been taken out of coherency, i.e. in its power down sequence by switching from symmetric (SMP) to asymmetric multiprocessing (AMP) mode by clearing the CPUECTLR SMP bit. In the CC6 flow, power down acts as the invalidation for the DVM targets. However, for retention, reset on exit may not be pulled and either a ramp up to service the DVM operations or to invalidate the structures, including the TLB and BTB, prior to entry into retention may occur. The i-cache may have been invalidated in the cache flush sequence. DVM operations may be assumed to be rare, unlike probes, and to support retention exit from a non-interrupt source, the DVM triggered exit may be similar to the exit path taken on probes while the cores are in a non-probeable C1 state. The code below may handle the probe path.

ClrCPULowPwrPre_m1[i]=(~CPULowPwrReq[i]
|SrqCPUPrbReq[i]|EarlyIntrReq[i]) & CPU-
LowPwrActive[i]&~WaitClrCPULowPwr[i]
&~ClrCPULowPwrFound; and SrqCPUPrbReq[i]=
((AnySrqPrbVal_d1|SrqAnyCPUPrbRsp)&~Srq-
MaskPrbWakeUpCPU[i])|CkExitToPstate_d1.

An exit out of low power on DVM detect may occur, and then a rentry may occur once the exit is complete, without modifying IobcOrHalt. Even though the i-cache is flushed, a core in SMP mode may still need to respond to i-cache invalidation DVMs and may see CPUQACTIVE deassert on the DVM operation.

The Q-channel logic on the core-side may be operational while the core is in retention. This means that operational voltage is in place, just a lower one with a guaranteed lower di/dt. This is the same constraint as NB AltVid. For backup and for potentially a lower retention voltage, a mode may be supported to invalidate the TLB and BTB in software and then turn off the SMP bit. In this mode, the unwind of the Q-channel handshake may be trivialized by assuming interrupts as the only source of exit, or disable the Q-channel handshake altogether. The latter is architecturally simpler but carries the risk of interfacing to the core in an unexpected way.

In RCC3 signaling from unified northbridge 280 to CK, the cores in an XV compute unit enters RCC3 all at once, e.g. non per-core C-state, and thus always couples nbsyn power off with RCC3 entry. This allows NB_PwrMgtReqPrbEn==0 to signal both RCC3 (vs probe-able C1) and nbsyn power off. During one implementation of RCC3, these may need to be separated. RCC3 is per core and nbsyn power off is per CPC or cluster. The nbsyn power off may be split off into a separate NB->CK interface signal, and refer to it as NB_PwrMgtReqCciEn, which is only cleared on the last core entering RCC3 or CC6.

To enter CC6, unified northbridge 280 may requests a power toggle on a clocking request to CK. CC6 is only permitted when cache and core states are flushed. CC6 provides additional power savings vs RCC3, but requires state restoration on exit, and thus increasing the exit latency. CC6 exit latency when restoring from the L2 is ~20 us to ~40 us and ~80 us when from the DRAM in the case that the whole CPC including the L2 is in CC6, a.k.a. XC6. RCC3 exit is ~1 us. CC6 exit is triggered no differently than CC1 or RCC3, which is to use the pending APIC interrupt edges to clear IobcOrHalt, and thus resulting in the exit condition.

GIC-400 does not implement a ProcessorSleep bit. Hardware implementations are expected to operate on the output from the CPU 102 interface co-located with the distributor in the GIC-400. GIC-400 may program the FIQ/IRQ behavior at its CPU 102 interface in three modes. These include (1) a normal mode where the nIRQCPU[n]/nFIQCPU[n] pins from the GIC are driven in all situations, (2) a bypass mode that overrides the GIC output with the legacy FIQ/IRQ pins, and (3) a bypass disable mode that masks IRQ/FIQ pins to cores and instead drives nIRQOUT[n]/nFIQOUT[n] pins to a power controller in presence of interrupts of the types for low power exit.

By way of example, the normal mode may be implemented and existing unified northbridge masking and interrupt wakeup mechanisms may be used. The GIC assume it is up in all circumstances and power management may withhold delivery around cases that edges will not be seen by the cores. This means around C6, existing C-state interrupt masking, used for RC3 and C6 but disabled for CC1, may form the hardware mask. In C6, clearing the mask (C6ExitReset) may be performed by software. StpClk mask may all be performed around C6. Since the C6 mask is set by hardware instead of software in the GIC-400 flow, no separate unified northbridge mask is required to filter edges around StpClk events. The unified northbridge hardware may internally determine the StpClk mask based on IobcOrHalt status and STANDBYWFI assertion. StpClk masking is not set on RC3 cores, as this may exit cores from retention to take the StpClk.

On C6 exit, the targeted core may reset and start fetching code from the exception vector, which is located at a fixed address at 0 or FFFF0000, or a separate address, via pin-strap coming out of reset. This address is typically mapped to a boot ROM. The exception vector implements a jump table, inside which the reset handler is an entry. Jumping to the reset entry then causes a reset handler. This code may check the C6ExitReset SPR to determine whether reset was pull for C6 exit vs. a warm/cold reset. C6 exit may then jump to the C6 handler and warm/cold reset may jump to the boot code. Given that unified northbridge 280 has the choice to specify which address the exception vector is located, unified northbridge 280 may choose to relocate the vector after boot to effectively uniquify C6 exit vs. warm/reset so that the reset handler does not need to check the type. This may allow the C6 handler to be placed in a different memory 104 region, so that it may be located in faster DRAM instead of a boot ROM to avoid the initial fetch from the ROM on C6 exit. To allow this, gasket 210 may implement software programmability of the exception vector location, so that after BIOS completes the reset flow, BIOS may set it to another offset for future C6 exits. Note that memory 104 mapping of the exception vector may have secure boot consequences, in which case, the PSP initializes the DRAM and deposits the secure boot code there before sending credits to gasket 210, effectively allowing the boot code to be mapped to DRAM. The non-secure boot may be located in boot ROM at a fuse configured address. C6 exit or secure boot may pin-strap the exception vector to an address in the C6 region located in the FDF7 range in DRAM. Gasket 210 then selects between these ranges based on fuse or C6ExitReset CCI signaling.

The core implements implicit XC6, which means we automatically enter XC6 on the last core entering CC6. RXC3 may be implemented by requiring L2 retention on the last core entering C-state where the final resulting cluster state is all RCC3 or a mix of RCC3 and CC6 cores. RXC3 may be commonly used after cache flush.

The L2 may be left unflushed (L2 dormant mode) and then ramping out of RXC3 to service probes. The last core may not be marked as the last cache flushed (part of the implicit XC6 requirement) and the probe may be served by ramping out of RXC3 even though its L1 may have been flushed, before returning it back to that state. RCC3 may be used to allow residence only after cache flush, which is backed by a monitor.

RXC3 mode mitigates the risk of a higher XC6 exit latency due to DRAM save/restore penalty expected to be around 80 us. RXC3 reduces this to ~1 us. This is a long latency for probes, but short for interrupts. The cluster may rely on the SMU to dynamically reconfigure between XC6 and RXC3 (along with CC6 and RCC3). RXC3 support may be an extension of RCC3. On the last core requesting to enter RCC3, unified northbridge 280 may perform the Q-channel handshake with the L2 alongside the core.

To support XC states in general, an L2 standby handshake (ACINACTM/STANDBYWFIL2) may be implemented. This satisfies the NbBusy requirement, which is a CPC's way of signaling that it is not ready for power management despite being architecturally idle. On ARM, the commit point for ACINACTM and STANDBYWFIL2 is different from probe drain and NbBusy. Therefore, the handshake may be performed before committing to low power, since by protocol, the L2 is permitted to forbid from seeing the STANDBYWFIL2 regardless of what unified northbridge 280 wants. After commitment, then drain, and the L2 guarantees to drop NbBusy to prevent hanging up. Therefore, for XC-states, the ACINACTM/STANDBYWFIL2 handshake may be performed on the last core entering RCC3 or CC6, and that handshake may proceed in parallel with the L2 L2QACTIVE/L2QREQn handshake for RXC3. When both XC handshakes plus the last core's RCC3 handshake are complete, SetCPULowPwr may be permitted to proceed.

Similar to RCC3, RXC3 may be permitted either with TLB and BTB invalidated and SMP mode disabled (similar to XC6), or left unflushed under SMP mode. In implementing a single cluster, once that cluster goes into RXC3, no core in the system may issue DVMs, and no L2QACTIVE deassertion may be attributed. Given caches are flushed and interrupts are masked in GIC-400, there should be no other conditions for L2QACTIVE deassertion either, and the L2 Qchannel interface may be trivialized like the CPU 102 ones. A clean up may be performed once exit first from retention and deliver the interrupts occurs. With a multi-cluster SOC, then an accounting for DVM broadcast handling if the cluster has not been disabled from SMP mode may be performed. In this situation, the L2 may be left operational while retention voltage to drop L2QACTIVE, and we may create an IobcOrHalt clearing term from L2QACTIVE deassertion to force exit on a designated core.

Complex power gating mode (XC6) may be employed. XC6 entry may use the ACINACTM/STANDBYWFIL2 handshake just like in RXC3. During XC6, gasket 210 powers off, so gasket 210 cannot communicate to unified northbridge 280 until all credits are released by unified northbridge 280. Thus, gasket 210 may be responsible to drive ResetUcodeGo when ready to accept credits, which is likely soon after reset deassertion. Gasket 210 may be able to tie ResetUcodeGo to STANDBYWFIL2 and STANDBY-WFI for all cores deasserting. The STANDBY signals are isolated to 1 during power gating and then reset to 0. The zeroes may not get exposed to gasket 210 until isolation is released by CPL. At that time, gasket 210 may be ready to accept credits by asserting ResetUcodeGo. This sequence may be the same for XC6 exit as for boot. For the latter, unified northbridge 280 may delay releasing credits on ResetUcodeGo assertion for secure boot reasons. This may not be the case for CC6 exit.

A Cache/State Flush may be performed. Existing unified northbridge 280 monitors try to predict deeper C-state residency on initial halt entry. This results in either a success, which allows an immediate flush request, or a failure, which leaves a shallow C-state (CC1). Thus, on short C-state intervals, failure may be predicted and an interrupt wake up may need to transition out of CC1, which is low latency. This monitor is backed by a secondary wait mechanism that allows a predicted failure to transition to a deeper C-state after timeout, to cover unpredictable or changing workloads. CC6+ states are backed by these monitors, and RCC3 may be either considered shallow (preflush) or deep (post-flush). There are also two different levels of monitors covering per-core (CC) states and per-CPC (XC) states.

On a flush request generated either by the monitor or wait mechanism, a StpClk may be sent to the targeted core. The core may flush the cache (and/or state depending on RCC3 vs CC6), mark the appropriate bits to signal the flushed state to unified northbridge 280 and then re-enter halt similar to pre-flush. Unified northbridge 280 may observe the flush status along with halt, and proceed to the deeper C-state when generating clocking/power request to CK.

The cluster implements a hardware L2 flush widget, generally used in explicit XC6, where no core is available to initiate a flush. Because implicit XC6 is performed on the core, the core may initiate the flush to make the underlying software and hardware interfacing uniform with x86 cores.

The cores may be in WFI before L2FLUSHREQ can be asserted. The core may not be used to initiate the flush request through SPR, and wait for completion. As such, since unified northbridge 280 flow may not include an L2 flush request on the last core entering low power, software may perform the L2 flush using cache maintenance operations. With this approach, no special logic may be required in unified northbridge 280 for flushing L2, and unified northbridge 280 may assume that the L2 is flushed when the request for the last core to enter low power is observed.

Figure 3:
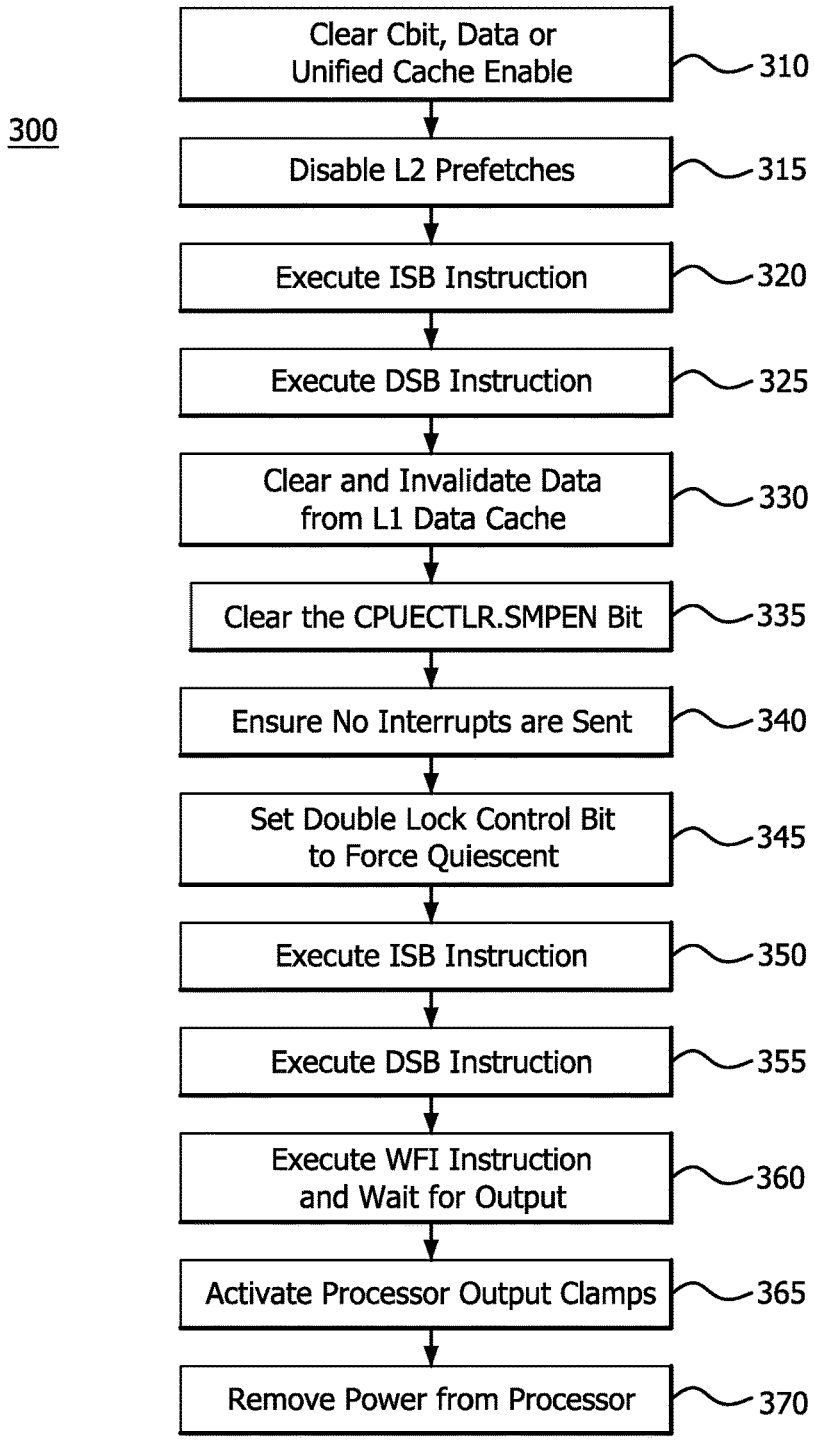
FIG. 3 illustrates a flow for interrupts to be masked through the whole C6 entry.

In x86 ucode, APIC interrupts are automatically masked when not in sleep. For long duration service routines such as cache and/or state flush, to avoid long stretches of uninterruptible code, ucode sprinkles in interrupt checks (intchks), which sample the core's interrupt edges for pending interrupts, and abort out of the flush if present. The cluster does not support the same software functionality. Instead, interrupts are to be masked through the whole C6 entry flow 300 of FIG. 3 described below. At step 310, the appropriate System Control Register C bit, data or unified cache enable, may be cleared to prevent additional data cache allocation. At step 315, L2 prefetches may be disabled by writing zeroes to bits[38, 36:35, 33:32] of the CPU Extended Control Register. An ISB instruction may be executed at step 320 to ensure the CPU Extended Control Register write is complete. A DSB instruction may be executed at step 325 to ensure completion of any prior prefetch requests. At step 330, all data from the L1 data cache may be cleaned and invalidated. The L2 duplicate Snoop Tag RAM for this processor may now be empty. This prevents any new data cache snoops or data cache maintenance operations from other processors in the multiprocessor being issued to this processor. At step 335, the CPUECTLR.SMPEN bit may be cleared. This clearing of the SMPEN bit enables the processor to be taken out of coherency by preventing the processor from receiving instruction cache, TLB, or BTB maintenance operations broadcast by other processors in the multiprocessor. At step 340, the system ensures that no interrupts are sent to the processor that is being powered down. The DBGOSDLR.DLK, Double lock control bit, is set at step 345 that forces the debug interfaces to be quiescent. An ISB instruction is executed at step 350 to ensure that all of the System register changes from the previous steps have been committed. An DSB instruction is executed at step 355 to ensure that all instruction cache, TLB, and branch predictor maintenance operations issued by any processor in the multiprocessor before the SMPEN bit was cleared have completed. An WFI instruction is executed and the STANDBYWFI output monitored for output at step 360 indicating that the processor is idle and in the WFI low-power state. The processor 102 output clamps are activated at step 365. Power is removed the processor 102 power domain at step 370.

Interrupt masking is done by setting the CPSR.I/F bits prior to step 310. Step 310 may make the processor non-coherent and thus may not require an interrupt to enter a handler not aware of this.

Intchk may not need to be implemented because (1) by implementing a hardware L2 flush widget, the only software cache flush requirement is the L1, which takes only 5000 cycles meaning the cache flush overhead in C6 entry is only in the single digit microseconds range, and (2) the cluster may exit WFI on IRQ/FIQ pin assertions even if interrupts are masked by CPSR.I/F and proceed to execute the next instruction. This may serve as an abort mechanism for C6 entry where a power controller chooses to avoid following through with the power down requested by the CPU 102. This may be an optional aspect of the suggested flow 300 in step 340 to enable the whole sequence non-abortable starting with CPSR.I/F masking before step 310.

Cache flush may not be incremental to C6 entry+exit for the worst case C6 interrupt latency, with the non-interruptible interval of cache flush also not the long pole in the SOC. The flow varies from the suggested flow in that the last core entering CC6, a.k.a. XC6 state, needs to flush the L2 using a software flow similar to that of the A15. The reason is because implicit XC6 entry is implemented. Software L2 flush may take much longer. To guarantee a reasonable interrupt service latency, intchks may be included for performance and for uniformity with x86. An intchk may be implemented on unified northbridge 28 side by exposing the FIQ/IRQ status via the CCI_INT_EDGE register (F3x2F0). Thus, in the cache flush routine, the software may set the CPSR.I/F bits, and then interleave polling the pre-masked edges with chunks of cache flush. The chunk size may be determined by a tradeoff between efficiency, i.e. making intchks infrequent to not affect flush bandwidth, and the uninterruptible interval, which may be made insignificant vs. the entry and exit latencies of the states, which is ~2 us for RCC3 and ~25 us for CC6. If an edge is seen in the register during cache flush at step 350, then the flush routine may reenable coherence by reenabling cache allocation (step 310) and L2 prefetch (step 315), and then clear CPSR.I/F bits to take the interrupt.

If the sequence has progressed to step 335 to disable CPUECTLR.SMPEN, then execution up to step 360 (skipping step 340). During these steps, if unified northbridge 280 targets a FIQ/IRQ, then a step in and out of WFI to the next instruction, and reenable cache allocation, L2 prefetch, and SMP. If not, then the system commits to C6. Unified northbridge 280 may take care of properly masking interrupts while committing to C-state, so step 340 may be unnecessary. Step 340 may be required to avoid hazards between the power controller disabling interrupts and committing to C6 entry, a step which unified northbridge 280 supports. This implementation requires step 340 to set a software disable in the power controller and thus requires an ACK back signaling proper masking and quiescing of all pending IRQ/FIQ delivery, before proceeding with a WFI that signals the entry. The implementation may use step 360 to convey the desire to disable interrupts and relies on hardware interlock between interrupt and commit.

Only one core may flush the L2 and this is complicated by allowing the L2 flush to be aborted when a core exits CC6. The L2I control bit indicates the last core up, in presence of multiple cores completing L1 flushes and deregistering with the L2, which allows one core to be the last, and forcing that core to do the L2 flush. One way to do that is to implement atomic access on a separate cache flushed vector in memory 104 to identify which core is the last core which sets the vector. That core doing the L2 flush may poll any PwrStatusLo (F5xF0) CC6 bit clearing for abort.

The core may implement a DAP controller inside the SMU block. This is a part of the CoreSight debug implementation. Standard debug tools interface to the DAP either through JTAG or a BP pin. DAP is unaware of the power status of the cluster, and may generate cluster or system requests. DAP requests may be made to the CoreSight logic resident in the VDD domain called KDSM. KDSM makes cluster debug requests through an ACP port, and system requests through an AXI bus into gasket 210. For DAP to access either cluster or system, VDD needs to be ramped out of PC6. Additionally, to make requests to the system through gasket 210, RXC3 or XC6 may need to be exited, get the nbsyn spinning again, and in the latter case, require UcodeResetGo and credit release. Because of the implicit XC6 implementation, one or more cores may be walked out of CC6.

To get the appropriate logic out of low power state to service the debug requests, DAP implements a CSYSPWRREQ/CSYSPWRACK interface with the power management logic. Prior to inserting debug requests, DAP may first assert CSYSPWRREQ. DbReq interrupt may be signaled if CSYSPWRREQ is asserted while the cluster is in either RXC3 or XC6. DbReq may awaken all cores, and an interrupt handler may signal DbRdy through NB_MISC. DbRdy may be signaled to CSYSPWRACK, which allows the DAP to then make requests. On exit, DAP may deassert CSYSPWRREQ. In order to allow the cores, now out of C-state to reenter low power, CSYSPWRREQ may be exposed on an SPR for the DbReq handler to poll. On seeing the deassertion, the handler may clear DbRdy and thus deassert CSYSPWRACK, and then return from interrupt. The OS idle routine may take over and allow WFI reentry, which then restarts the C-state entry process. This similar to PDM mode. However, the cluster does not implement the HDT2 interface to SBI_IAI, which means a poll for exit may be needed instead of having exit signaled through SBI_IAI.

In x86, P-states may be exposed to the OS via ACPI calls The OS then requests P-state changes by calling pre-defined MSRs, which the ucode traps and writes a P-state id to the CofVidCtl register in unified northbridge 280. The P-state id maps to a P-state table entry, which has a programmed frequency (FID/DID) and voltage (VID) setting. Depending on if there is a difference between the current and the requested frequency and voltage settings, a frequency and/or voltage change may be requested. Unified northbridge 280 may internally generate up to two requests, and order the requests such that a voltage increase is ahead of a frequency change, which is ordered ahead of a voltage reduction. Voltage changes are satisfied internally between unified northbridge 280 and CPL without core interaction. Frequency change requires core interaction. Unified northbridge 280 orders the frequency change with those requested by other CUs/CPCs or by unified northbridge 280 along with other power management requests such as voltage change, external StpClks, or cache flushes. When a frequency change gets picked, unified northbridge 280 targets a StpClk to all the enabled, non-CC6 cores in the CU/CPC and blocks CC6 cores from exiting. The core(s) then take the StpClk and send a HTC SBC system management broadcast to acknowledge the frequency change, quiesce all outstanding traffic, and then drop ConnectMask. Once all cores targeted with StpClk complete these steps and those pending CC6 entry have completed the entry, unified northbridge 280 may then make a frequency change request to the CPL. On completion, unified northbridge 280 raises a StartClk edge to the CU/CPC, which prompts the ucode to exit its quiesce and return to OS.

Figure 5:
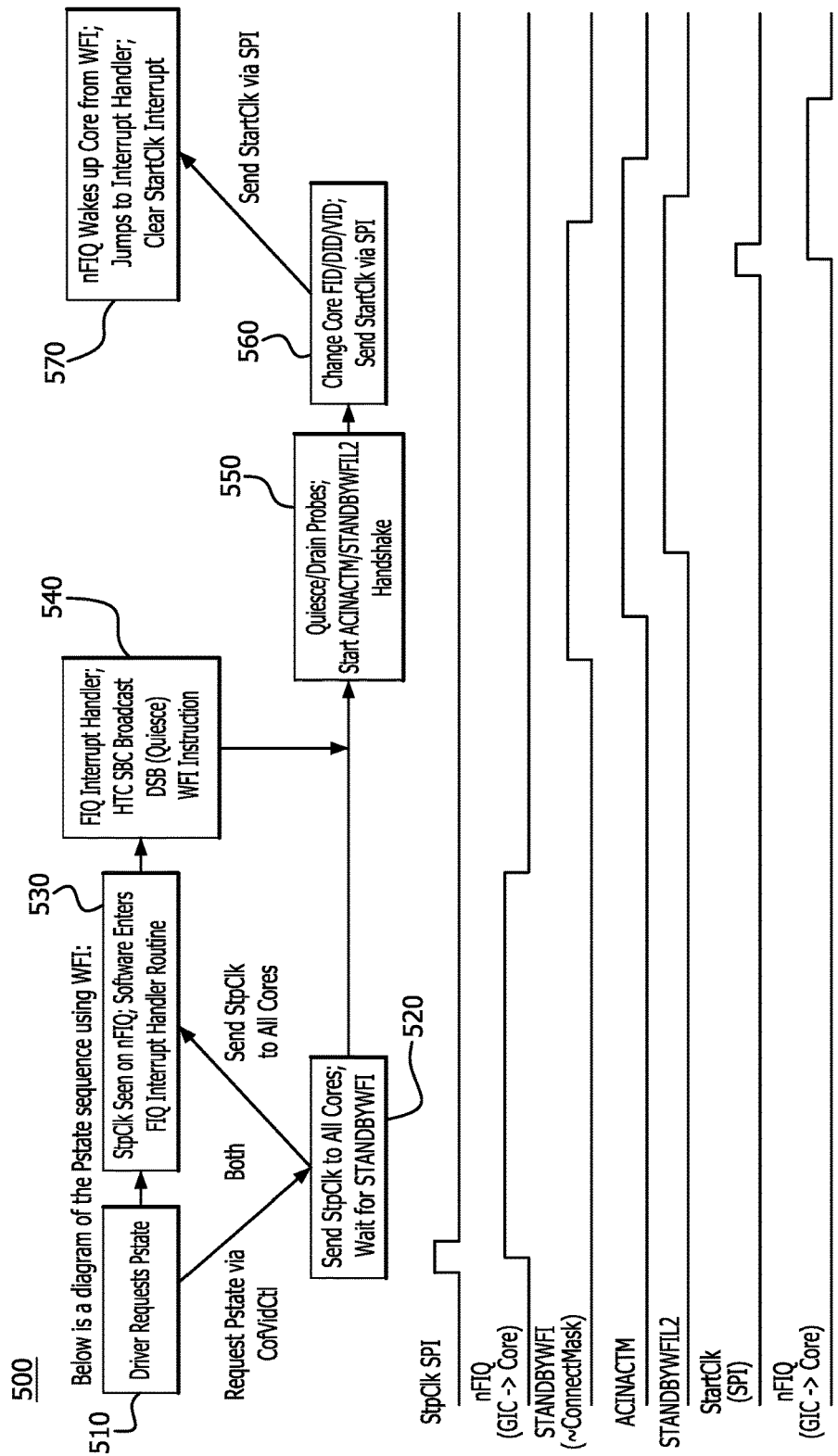
FIG. 5 illustrates an example diagram of the Pstate sequence using WFI.
Figure 6:
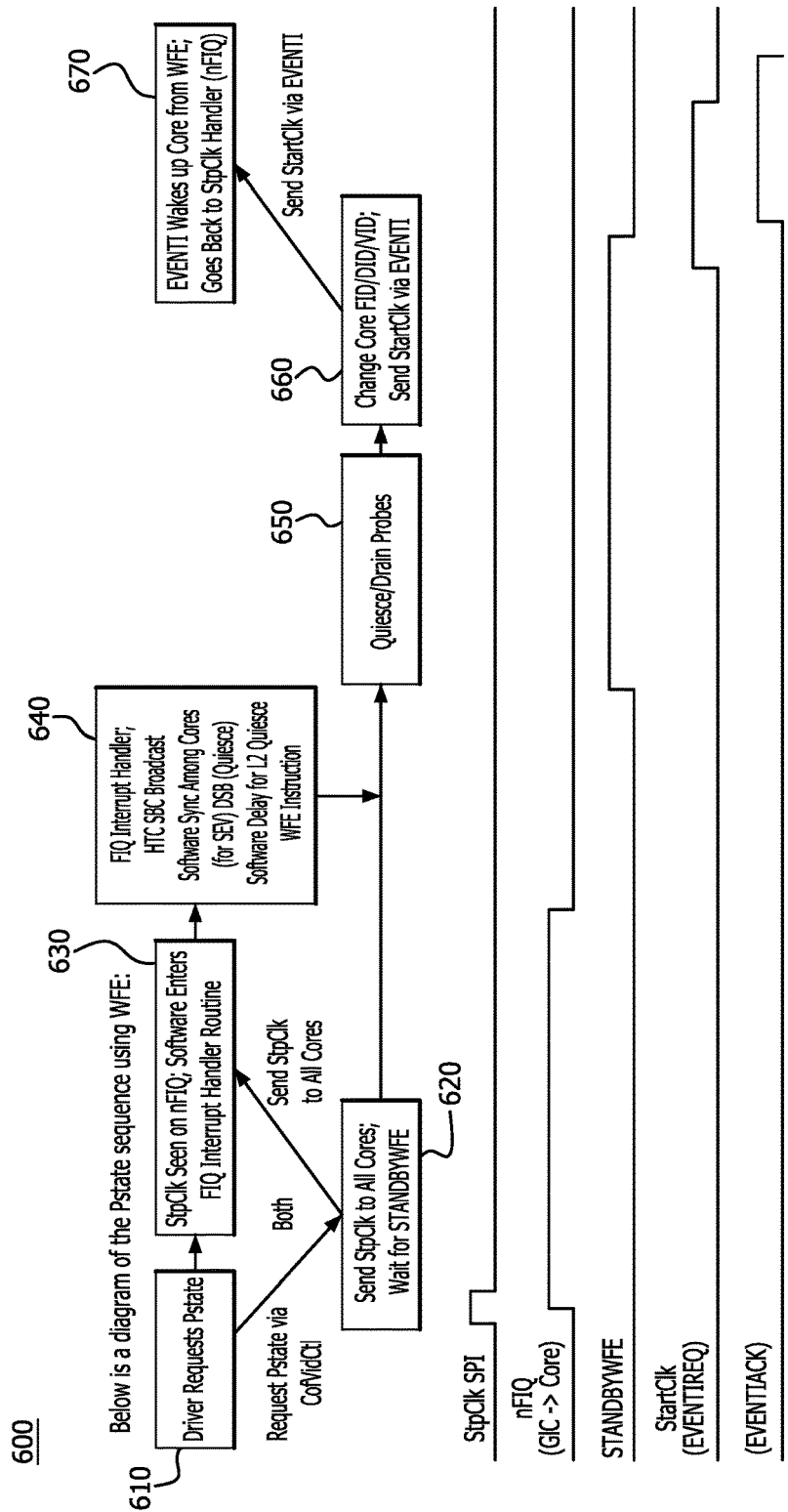
FIG. 6 illustrates an example diagram of the P-state sequence using WFE.

In ARM implementation, instead of an ACPI call, the OS calls the CPUfreq kernel driver, which implements a vendor-neutral API interface to Android, similar to that of the CPUidle routine for C-states. For Android, the CPUfreq interface is that of a performance level indicated by a percentage of the maximum. The CPUfreq routine may then map that percentage level to one of our 8 discrete P-state levels, and request that in the CofVidCtl register in unified northbridge 280. From that point on, a similar flow for the frequency change may be expected, which needs a picker select, quiesce, frequency request, and unquiesce. The quiesce and unquiesce parts are what then differs in the implementations. Two methods depicted in FIGS. 5 and 6 described herein below may be implemented individually or in unison to mitigate risk, which is presented in the form of protocol/hardware complexity, and performance. Generally, these methods may interrupt the CPU using GIC to place the processor in the ARM defined WFI or WFE states. Either state may prevent CPU 420 from executing further instructions and initiating new transactions across the clock domain boundary. FIGS. 5 and 6 provide interface/flow details below. Both types of quiesce may be implemented for risk mitigation and enable one by config. The interrupt based ones may need to be implemented for S3, and may not be replaced with a gasket 210 based one, and the incremental cost to support P-states may be near zero. Gasket 210 based one may have better performance but carries protocol and cross-IP verification risks.

Figure 4:
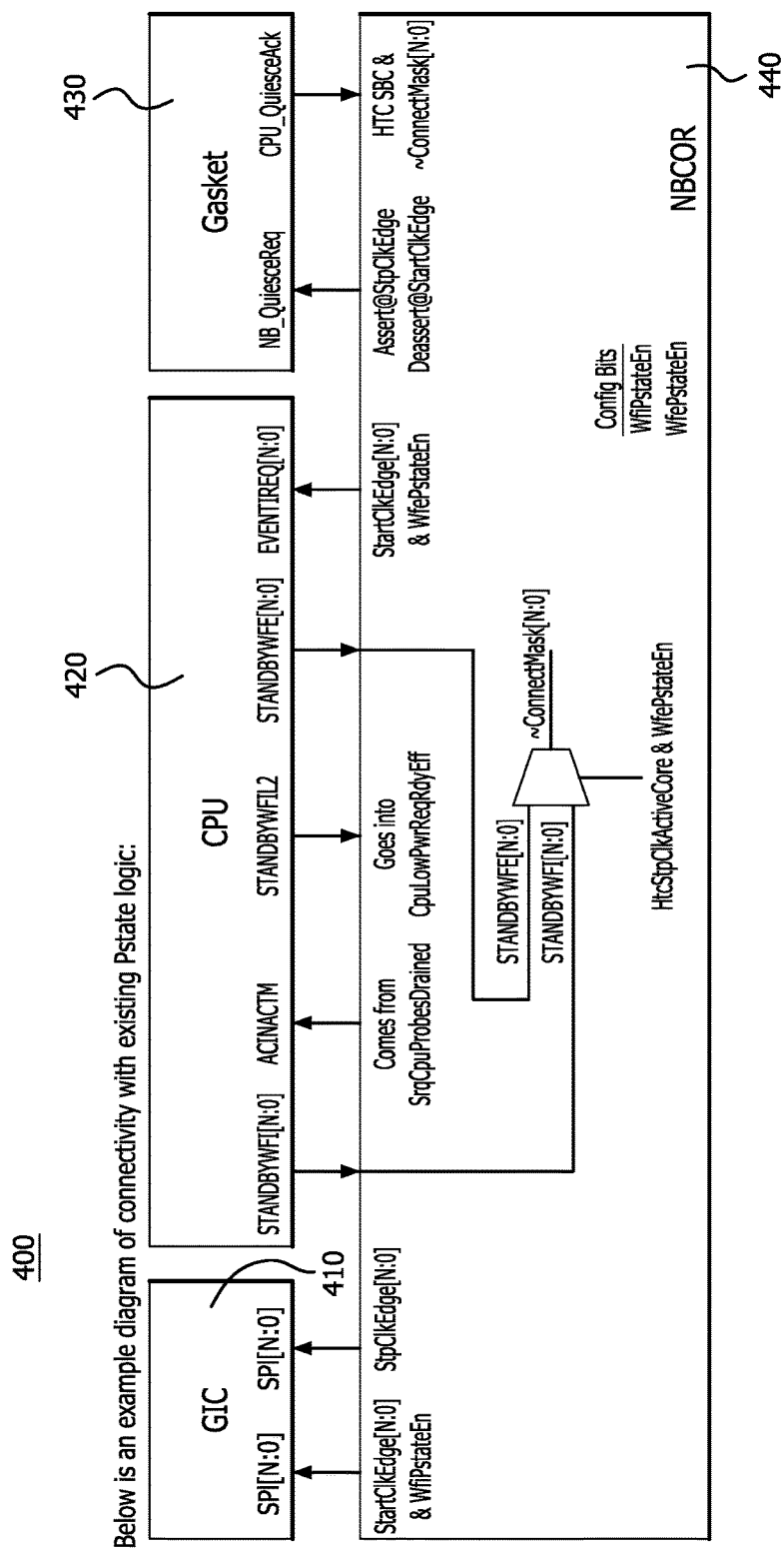
FIG. 4 illustrates an example diagram of connectivity with existing Pstate logic.

An example diagram 400 of connectivity with existing Pstate logic is shown in FIG. 4. FIG. 4 shows connectivity with existing P-state logic. Shown in FIG. 4, there is a GIC 410 that is an ARM generalized interrupt controller that delivers the interrupt. GIC 410 may be located within unified northbridge 280. CPU 420 is also shown. CPU 420 may be a portion of atlas cluster 290. Gasket 430 is also shown in FIG. 4 and may be a portion of gasket 210. Also, NBCOR 440 is shown. NBCOR 440 may be a portion of unified northbridge 280 including the CCI protocol discussed herein above. As may be seen each of GIC 410, CPU 420, and gasket 430 may communicate with NBCOR 440. Each of these communications and signals will be described herein below.

Interrupt based quiesce and unquiesce may provide the least hardware cost approach to P-states is to do the StpClk based quiesce by hooking StpClk to FIQ. FIQ may be used as a secure interrupt. If trust zone is not implemented in the core and GIC 410, then FIQ may be available and StpClk may be straightforward and providing little risk to performance. For normal interrupts (wired to IRQ), the software convention is non-reentrance on the IRQ exception vector. This means if a higher priority IRQ interrupt arrives, the higher priority interrupt is not allowed to preempt a lower priority IRQ interrupt currently serviced by a core. For performance reasons, Android breaks an interrupt service routine into top and bottom halves. The top half is the uninterruptible half. The convention is to simply take the interrupt, figure out what needs to be done, and then schedule a bottom half with the OS to do the actual work, before returning the call and thus returning to interruptible code. The bottom half is what then does the actual work.

However, across different exception types, the hardware guarantees full preemptibility by banking critical control flow registers, such as the stack pointer, link register used for call return, and status registers. According to convention, IRQs would not mask FIQs, so that the latter may be taken even when in the top half of the IRQ handler. In a non-secure system, the StpClks may be taken with little latency, needed for P-state changes, given cores are taken out of normal work to be put into a quiesced state. However, if trust zone is implemented, then the FIQ interrupt may need to fall into the framework of the security monitor. P-state changes may be registered and other StpClk sources as secure services. The FIQ pin may be shared with other services. One way to do this is to rely on the top half of the FIQ routines to be minimal according to convention, but that risks a misbehaving trusted service affecting the performance on the whole system. A StpClk may act as a barrier synchronized quiesce, where a late arriving thread behaves as a badly parallelized program. The alternative is to make the FIQ exception handler reentrant. Instead of true reentrance like other architectures, where the return address gets pushed to the stack, the link register is banked for each exception mode, so to allow reentrance for one exception, then switching to supervisor mode (SVC) to use its banked link register for return address, and thus freeing up the FIQ link register for another entry into the exception vector. This may allow two instances of reentry into FIQ. To support StpClk preemption of other trusted services, then the FIQ exception handler needs to switch to SVC mode while leaving interrupts masked for other trusted service interrupts except StpClk.

On servicing a P-state StpClk, the code may send an HTC SBC system management broadcast to unified northbridge 280, quiesce all outstanding traffic by doing a data synchronization barrier (DSB) instruction, and then signal wait-for-interrupt (WFI/WFE). The DSB instruction in this case acts as a wait-for-quiet. A wait-for-quiet waits for all responses to outstanding requests, as well as for token releases, but a DSB only waits for the responses. Given ACE implementation of a valid/ready interface, seeing the responses may be sufficient for quiesce. An implementation using the token based SDP interface may need a true wait-for-quiet for quiesce scenarios, if any, on SOC15. The WFI/WFE is simply to signal readiness for the frequency change to unified northbridge 280.

Once unified northbridge 280 sees core readiness in the form of WFI for the P-state change, unified northbridge 280 may quiesce probes to the cluster by blocking them from being picked, drain its pipeline free of probes already picked, and wait for outstanding probes to deallocate their buffers as the cluster completes them. Once probes are drained, unified northbridge 280 needs to do an additional ACINACTM/STANDBYWFIL2 handshake with the cluster before scheduling the P-state change at CPL. ACINACTM is SrqCPUProbesDrained and STANDBYWFIL2 may be an additional term that blocks readiness at the SetCPULowPwr picker. This L2 handshake is similar to that performed for RXC3 and XC6, except in the case of P-states, it is not trivialized with cache flush and the probes are actively drained. The order of probe drain is reverse of what may be performed in x86, where commit occurs before the drain. For the cluster, drain may be first before commit. Unified northbridge 280 supports this mode via EnDrainPrbOnHtcStpClk, which starts the probe drain prior to commit. For the core, EnDrainPrbOnHtcStpClk=1 may be required when enabling the interrupt based quiesce.

WFI variant of StartClk may include that while the cluster is in the midst of P-state change, the cluster may not take an interrupt or make a system request. Interrupts edges are masked by unified northbridge 280 as is done on APIC edges in x86 during power management events. However, software may not perform the intchk described earlier because that may require requests to the unified northbridge 280. Thus, instead of intchk, unified northbridge 280 may wake the core out of quiesce once CPL completes the P-state change. This may be done with a StartClk interrupt. However, a StartClk interrupt implies that the StpClk needs to be preempted. If FIQ reentrance is allowed during StpClk, and if trust zone already requires reentrance, then that adds up to three levels. Other secured services may be made non-reentrant or implement non-standard interrupt reentrance over StpClk. Given that the only interrupt that is preferable to interrupt in StpClk is a StartClk, shortcuts may be taken, e.g. saving the link register address in a general purpose register instead of pushing to stack. The latter requires configuring StartClk to have the highest FIQ priority, which should be possible given vendor support of trust zone.

An example diagram of the Pstate sequence using WFI 500 is shown in FIG. 5. Pstate sequence using WFI 500 may include a driver request Pstate at step 510. At step 520, a send StpClk to all cores is performed and then a wait for STANDBYWFI is waited for. Approximately simultaneously to step 520, step 530 provides a StpClk seen on nFIQ and the software enter FIQ interrupt handler routine. At step 540, the FIQ interrupt handler activates, the HTC SBC broadcasts DSB (quiesce) and a WFI instruction. At step 550, the probes are drained/quiesced and ACINACTM/STANDBYWFIL2 handshake is started. At step 560, core FID/DID/VID is changed and StartClk is sent via SPI. At step 570, the nFIQ wakes up the core from WFI and jumps the interrupt handler and clears StartClk interrupt.

Another way to wake up from StpClk is to use WFE instead of WFI after quiesce. WFE wakeup could trigger from either interrupts or events via the EVENTI pin. Thus, all interrupts, IRQ and FIQ, may be masked off and still be able to wake on EVENTI, which essentially serves the purpose of the StartClk. To enable WFE StartClk, STANDBYWFE may be multiplexed to ~ConnectMask for all P-states (based on HtcStpClkActiveCore) and STANDBYWFI for all other situations. StartClk may then be hooked up to EVENTI in this mode to trigger exit. Once the core exits from WFE, it may still be in the StpClk handler, which will unmask interrupts and exit.

To support multiple clusters, the StartClk edge may be multiplexed to EVENTI when doing P-states and EVENTO in all other situations. In normal mode, all EVENTO are ORed together and driven into EVENTI. Since there may not be any EVENTOs, They may be swapped and the internal StartClk edge may be mapped to EVENTI.

For the core, either StartClk variant by config may be enabled. The existing StartClkEdge may be routed to both EVENTO and GIC 410 distributor SPI pins assigned to StartClk. When WFE StartClk mode is enabled, then ConnectMask and EVENTI may select appropriate WFE signaling, and the SPI ids associated with StartClk may be disabled. For WFI StpClk mode, GIC 410 programming of the StartClk SPI ids may be assumed.

A core may be in user code where it may be executing SEV instructions at the time of StpClk service. Different cores may take the interrupt at different times, so it is possible that without any software guarantees that one core may have already executed the WFE in the StpClk handler while another core executes a SEV prior to taking the StpClk. To properly service this flow, the StpClk handler may perform software synchronization prior to executing the WFE. Unified northbridge 280 provides hardware semaphore and scratch registers. The StpClk handler may use the hardware mechanisms to atomically update each core's presence in the handler, along with using the CC6 status from PwrStatusLo register to advance into WFE.

L2 may not implement a STANDBYWFEL2 interface. Provided that prior to WFE, the cores may execute a DSB instruction, which quiesces all outstanding requests, there should be no pending requests or allocations to the L2. This may guarantee that there should be no L2 prefetches or victims to the DRAM. To assure this is the case, software may delay WFE after the DSB, and thereby delay unified northbridge 280 from committing to the P-state change, which needs to happen without waiting for STANDBYW-FIL2.

An example diagram of the P-state sequence using WFE 600 is shown in FIG. 6. Sequence 600 includes a driver requesting Pstate at step 610. At step 620, StpClk is sent to all cores and the system waits for STANDBYWFE. Approximately simultaneously, StpClk may be seen on nFI and the software enters FIQ interrupt handler routine at step 630. At step 640, the FIQ interrupt handler is readied and the HTC SBC is broadcast, a software sync among core (for SEV) occurs with DSB (quiesce) and a software delay for L2 quiesce occurs with a WFE instructions. At step 650 the probes are drained/quiesced. At step 660, the core FID/DID/VID is changed and the StartClk is sent via EVENTI. At step 670, EVENTI wakes up core from WFE and goes back to StpClk handler (nFIQ).

Figure 8:
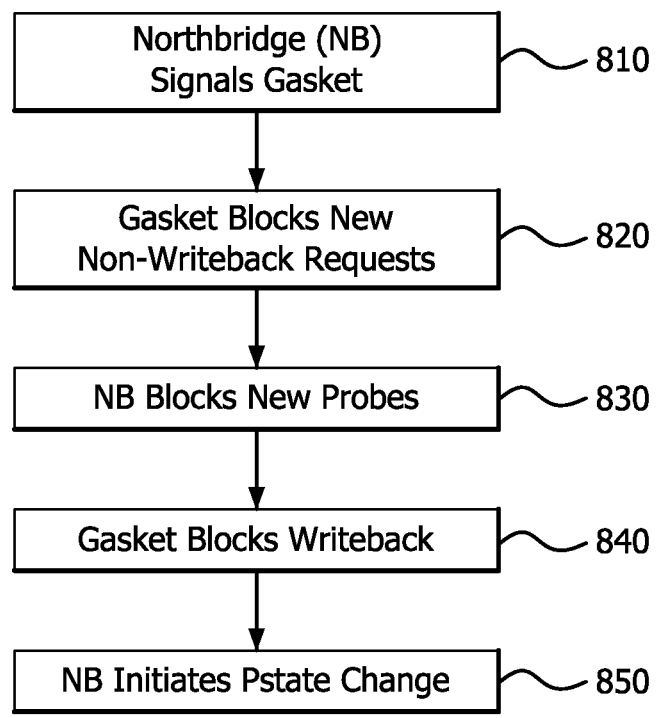
FIG. 8 illustrates a method 800 provided to guarantee draining all inflight traffic across NBSYN between gasket and unified northbridge.

The StpClk/StartClk based quiesce requires the least incremental logic from the existing unified northbridge 280. However, there is risk to performance and it adds additional software complexities if trust zone interrupts need to be handled inside the core. To mitigate these risks, an alternate mode of quiesce is allowed to be implemented within gasket 210 and made invisible to the cluster. On a high level, the ACE interface between the cluster and gasket 210 to continues to operate, but quiesce the CCI interface on either end of the NBSYN. Gasket 210 may block new requests and wait for outstanding responses instead of the core. This trades the above risks with that of the additional hardware mainly in gasket 210, and the protocol dependencies that come with this implementation. The main protocol dependency is between probe and writebacks. On ACE, writebacks (victim requests) are placed on a separate virtual channel from normal requests that make forward progress to DRAM with no other dependencies. The cluster relies on this by allowing probes hitting on writebacks to block until these writebacks complete. Therefore, for unified northbridge 280 to quiesce probes, the core must be allowed to complete writebacks. A method 800 shown in FIG. 8 is provided to guarantee draining all inflight traffic across NBSYN between gasket 210 and unified northbridge 280. At step 810, method 800, provides that on P-state change request, unified northbridge 280 signals gasket 210 through sideband to quiesce acting as a StpClk. At step 820, gasket 210 blocks new non-writeback requests from being sent to unified northbridge 280 and drains all outstanding ones. When done, gasket 210 signals a "quiesced" response to unified northbridge 280. This acts like an HTC SBC system management command. At step 830, unified northbridge 280 blocks new probes from being picked and waits for outstanding probes to complete by checking its probe buffer credits. At step 840, gasket 210 blocks writeback only when no probes are outstanding from unified northbridge 280. Gasket 210 may drive NbBusy as long as there are pending writebacks to unified northbridge 280. At step 850, unified northbridge 280 may be permitted to initiate P-state change only when all probe buffers are returned and gasket 210 is not asserting NbBusy.

The unquiesce portion may be performed by unified northbridge 280 deactivating the quiesce request and gasket 210 responding by removing the "quiesced" response. Unified northbridge 280 then needs to guarantee that the ACK (response) has been deasserted from the previous handshake before initiating a new request. Thus, the change to unified northbridge 280 may be the sideband request/ACK to gasket 210 for quiesce and to deactivate the use of StpClks for P-states. This should be simple, since we drive and sink both states already in current design. However, this may add additional work to gasket 210. This doesn't eliminate StpClks altogether as they may be needed for cache flush and S3. For cache flush, intchks may be used and S3 is heavily OS and BIOS involved.

Figure 7:
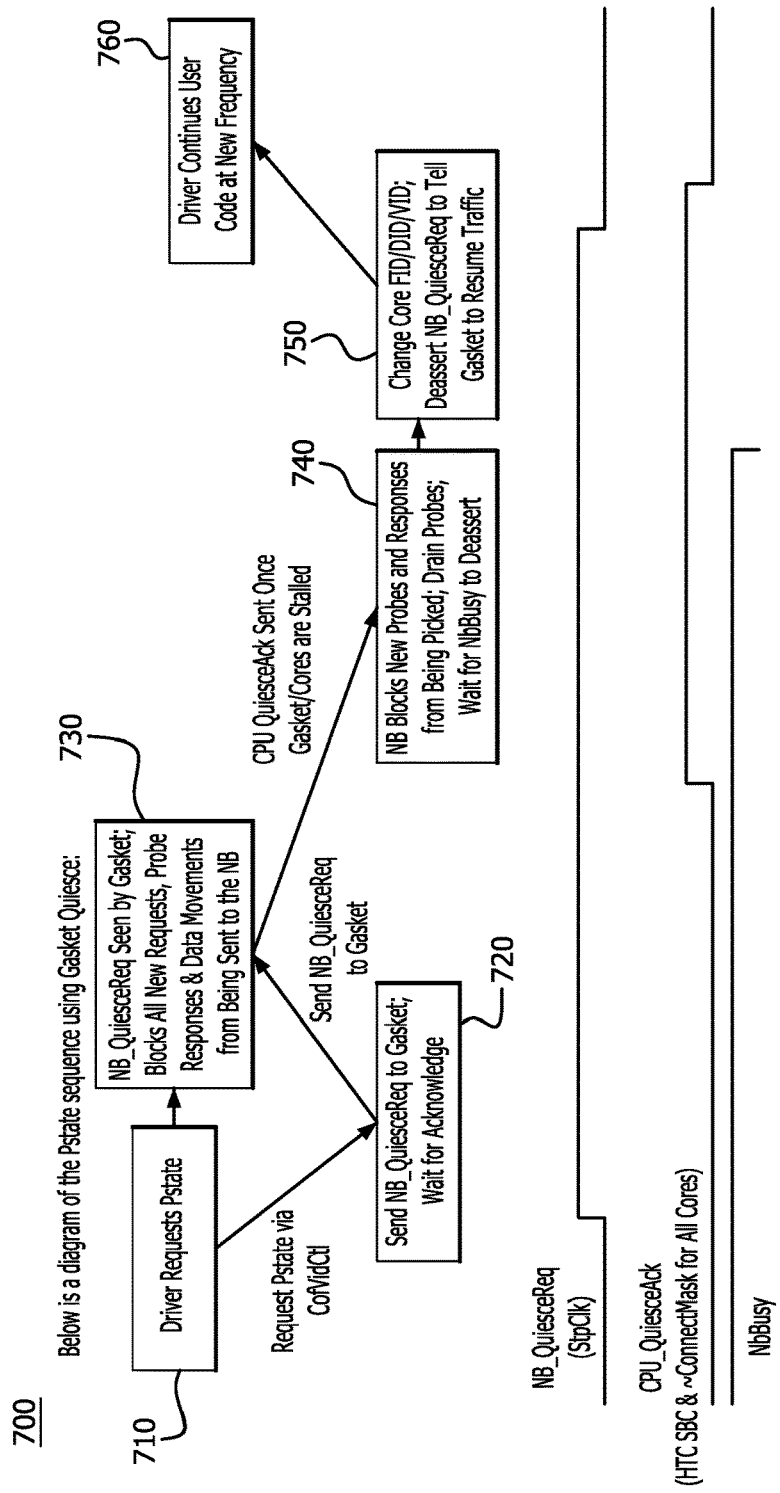
FIG. 7 illustrates an example diagram of the Pstate sequence using gasket quiesce.

An example diagram of the Pstate sequence using gasket quiesce 700 is shown in FIG. 7. This Pstate change may occur by providing a stalling of the interface transaction progress in the gasket 210 which sits between the two boundaries. As shown in sequence 700, may include a driver requesting Pstate at step 710. At step 720, NB-QuiesceReq is sent to gasket 210. Approximately simultaneously, at step 730, NB-QuiesceReq is seen by gasket 210. At step 740, the unified northbridge blocks new probes and responses from being picked, drains probes, and waits for NbBusy to deassert. At step 750, core FID/DID/VID is changed, NB-QuiesceReq is deasserted to tell gasket 210 to resume traffic. At step 760, the driver continues user code at a new frequency.

Unified northbridge P-state may be performed via the same mechanism as CPU P-state. For a multi-cluster system, all clusters need to be quiesced as opposed to just a single cluster targeted by CPU P-state. Unified northbridge C-state may remain unchanged.

S3 initiation may be performed by collaboration between the OS and the BIOS. StpClk support may be initiated by an IO read to the FCH after all devices are placed in D3. The FCH then initiates an external StpClk flow. The ARM StpClk flow may be used to provide which signals the StpClk via an SPI to the GIC 410 to all cores. The interrupt handler may mask interrupts and then send a StpGnt SBC to unified northbridge 280. At that time, the cores may remain interrupt masked in StpGnt until power off. The interrupt handler does not need to account for a StartClk, though it may do so if it shares the code with P-state changes provided the latter supports the interrupt based quiesce. The software delta vs P-state change is just the encoded type of the special broadcast cycle. Unified northbridge 280 may use the StpGnt status on all cores to initiate entry into DRAM self-refresh. After the FCH receives the StpGnt, the FCH may start a timed wait, pull warm reset and ramp down VDDNB. On exit, S3 may resemble a cold reset and rely on software to identify boot vs S3 exit.

The CS flow is mainly another software layer on top of S3 to help with exit acceleration and security. Hardware supports some CS specific register fields for software to keep track of its state during the save and resume process.

The CAC interfaces between unified northbridge 280 at the core CAC manager (a.k.a. DPM) and may not exist in the cluster. The DPM may be implemented in gasket 210. The DPM may communicate to unified northbridge 280 via the FU request/response interface. The DPM may use cluster performance monitor outputs and assign CAC weights. If that is implemented, then Bidirectional application power management (BAPM) may be supported. If it is not implemented, then BAPM may be temperature based and therefore less accurate, and energy accumulation may be disabled. However, in either case, the SMU may communicate the BAPM P-state limit via the existing SmuPstateLimit.

One example of the Intelligent P-state (iPstate) is FP throttling. This is implemented with the HDT2 interface on x86 cores. The cluster has a similar interface called CoreSight. Supporting iPstate requires CPL changes to map HDT2 onto CoreSight. iPstate may use the SMU P-state hardware mechanism in unified northbridge 280 shared with the AVFS feature. The interface between SMU and Unified northbridge 280 for SMU P-state is expected to remain the same.

C-state boost allows a subset of cores to be boosted to Fmax at a potentially higher voltage when the remaining cores are in CC6. C-state boost is handled entirely in unified northbridge 280 hardware without SMU interactions. Because it operates on the backend of P-state changes and CC6, there are no incremental changes required to support P-states and C-states.

A dedicated writeback channel may be used to avoid deadlocks. One hard token may be added in XCS/SPBC/SPBD/MCQ/MPBD for VicBlk requests from CPU 102. The core does not respond to probes on a collision with an outstanding victim. The victim channel may be used to drain and after the victim command is done, the core may respond to a probe as a miss. CPU 102 victims may make it to MCT in a guaranteed manner.

Figure 9:
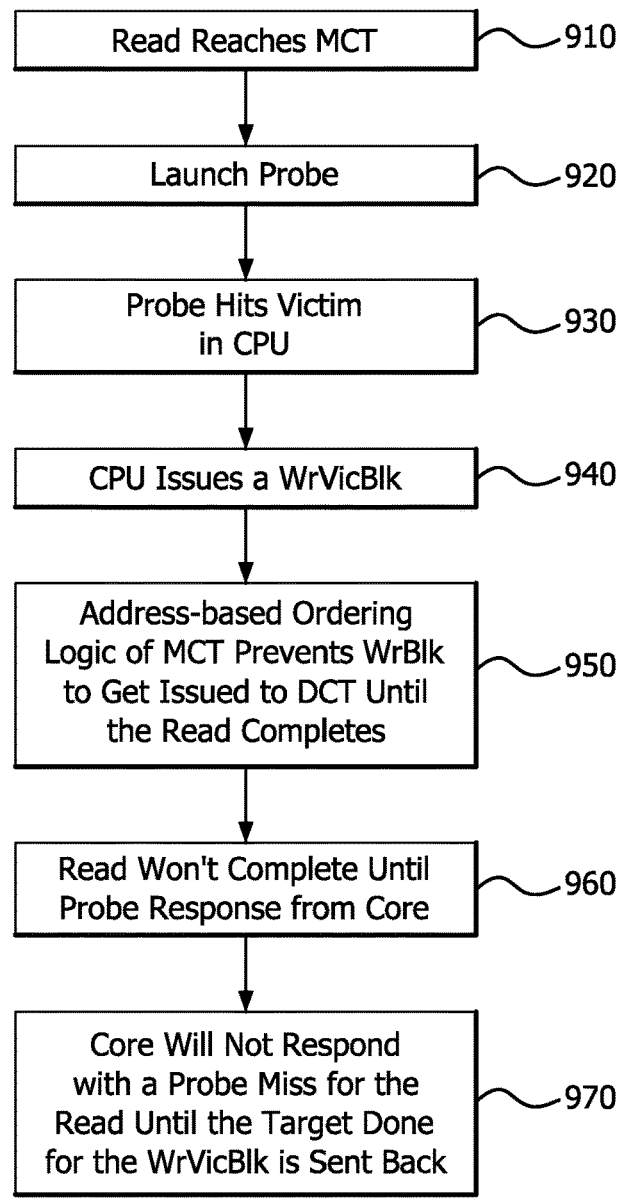
FIG. 9 illustrates a flow of a deadlock.

Referring now also to FIG. 9 showing a flow of a deadlock 900. A read (Rd) reaches MCT at step 910. The probe is launched at step 920 and the probe hits a Victim in CPU 102 at 930. The CPU 102 issues a WrVicBlk at step 940, which reaches MCT but then the address-based ordering logic of MCT kicks in and will not allow the WrBlk to get issued to DCT until the original Rd completes at step 950. The Rd will not complete until a probe response is received from the core at step 960 and the core will not respond with a probe miss for the Rd till the TargetDone for this WrVicBlk is sent back to the core at step 970. This is the deadlock condition.

The CPU 102 may push the data on the write data channel to gasket 210. The CPU 102 is waiting for a write response indicating that the writeback is complete before the CPU 102 responds to the conflicting probe. This may be provided after northbridge 280 pulls the data from gasket 210 and gasket 210 receives target done communicated by the write buffer release. If the CPU 102 issues the writeback, gasket 210 and the SRI may deliver the writeback to memory 104. Deadlock 900 from the earlier read through the probe to the CPU 102 which is waiting for the writeback to complete. The writeback may be acknowledged, such as immediately, for example, from the CPU 102 in gasket 210 and let gasket 210 be responsible for maintaining coherency including responding to probes and downgrading the victim state. Gasket 210 may be full and the blocking writeback may be inside CPU 102 and still blocking the probe. Deadlock 900 may be caused by issued writebacks and those that are in the internal CPU 102 request queue to block probes. A virtual channel from the CPU 102 to MCT may be created, with the MCT allowing writebacks to pass older requests.

Gasket 210 may become full of non-writeback writes. However, these are already guaranteed to make forward progress and there is a CPU 102 restriction on interleaving writebacks and non-writebacks that prevents a full gasket 210 from blocking an internally queued CPU 102 writeback causing a probe deadlock.

A probe which hits a dirty line in the cache may not respond until the victim is actually drained to the DRAM. Hence, to create a deadlock free system, a new writeback channel has to be added. For this new writeback channel dedicated buffers may be allocated in the XCS/SPBC/SPBD/MCQ/MCD, so that guaranteed forward progress may be provided for victims. The SRQ may need a dedicated hard allocated token for the Victim/writeback from the core. This writeback channel may extend back to gasket 210 and the token allocation scheme in gasket 210 may ensure that victims make forward progress from the core to the SRQ and that SRQ will always have an available token for victim.

In order to prevent deadlock a 4-hop protocol may be forced probes may issue a PrbTgt flavor. Since there may only be one CPU 102 cluster, requests from CPU 102 only have to send probes to GPU and those responses go to MCT. Similarly, RdBlkS requests from GPU may only PrbTgt on CZ and the responses go back to MCT. I/O requests may be forced to receive the probe response back to MCT and then MCT may send a final response with the dirty or clean data. This may allow implementation of a scheme to read DRAM again. Probe/victim collisions are handled by stalling probe responses and expecting the victim to make forward progress.

Once the victim completes it may issue a probe response miss. This requires a dedicated writeback channel, allowance for victims to pass older requests in MCT, and for MCT to issue probe target for host bridge reads instead of probe source. Issuing probe target may allow MCT to consolidate probe responses, DRAM read data, and possible victim passing cases and to then issue a single read response (or TgtDn in the conversion case) back to SRI.

XBAR->MCT requests now allocate an MCD entry to accept dirty data or data from a younger passing victim. As with other XBAR->MCT requests both McdLo and McdHi tokens are reserved. Non-Host bridge requests that do not carry data (i.e. CPU 102 reads) immediately release those tokens in mp1. Host bridge (HB) read Tokens for the unused channel are released in mp1 (New terms Hb4HopMcdLoBufAvail/Hb4HopMcdHiBufAvail). Previously only commands with data allocated MCD tokens. MCD token management logic for data commands is unchanged.

To resolve the deadlock between write backs and probes, a virtual channel may be added for writebacks. Part of this feature involves allowing writebacks to reorder ahead of older reads once it reaches MCT. This involves quite of few changes, such as reissuing earlier DRAM reads when this bypass occurs. CPU 102 may not return a probe response if the block being probed is in the process of being victimized. Instead, CPU 102 just sends the victim. The approach being taken is to detect that the victim is effectively the probe response and may be treated as such.

When a victim arrives, it may be checked for an address match with older ops. If a match is found, the victim may be checked to see if it meets the following criteria:

Is a match to a read (not prefetch) which is waiting on a probe response, or

Is a match to a write which is waiting on a probe response.

If multiple address matches are detected, the oldest one is selected. This is identified by a copy of the MCQWaitOpRet flag that is now saved in the MCA using the principle that the oldest op is the one not waiting for any prior ops to retire.

So when a victim arrives, it may follow one of three flows:

1. If the victim does not match to a prior op which is looking for a response, the victim is treated just as it has been in the past.

2. If the victim matches to a write which is waiting for a response, the victim is treated as a probe response, and is merged into the prior write's MCD entry. The new MCD entry which had been allocated to the victim is released. This type of victim cannot be considered to be a source of forwarded data since it does not have its own MCD entry. This victim does not do a write to DRAM (that is handled by the write that the victim merged to). It is allocated its own MCQ entry, and may send a TgtDn when it's done.

3. If the victim matches to a read which is waiting for a response, the victim is merged into the read's MCD entry and is written into its own MCD entry, since it needs to be sent to DRAM. The victim data in the new MCD entry is treated like a normal victim; it may be forwarded from, write to DRAM, and sends TgtDn when complete. A second MCD write port may be needed for flow #3 (victim-matches-read) in order to write the new MCD entry.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
    a unified northbridge (UNB) having a cache coherent interconnect (CCI) interface;
    a processor having an Advanced eXtensible Interface (AXI) coherency extension (ACE) interface; and
    a gasket communicatively coupled between the UNB and the processor, wherein the gasket is configured to:
        translate requests from the processor that include ACE commands into equivalent CCI commands, wherein each request from the processor maps onto a specific CCI request type.

2. The system of claim 1, wherein the gasket is further configured to translate ACE tags into CCI tags.

3. The system of claim 1, wherein the gasket is further configured to serialize ACE requests having the same ACE tag within the gasket in order to prevent transactions with duplicate tags from reaching the UNB.

4. The system of claim 1, wherein the gasket is further configured to translate CCI encoded probes from a system resource interface (SRI) into equivalent ACE snoop transactions.

5. The system of claim 1, wherein the gasket is further configured to use a memory map to create expected auxiliary address type signals to be sent with each request to a system resource interface (SRI).

6. The system of claim 5, wherein the gasket is further configured to translate the memory map to inter-operate with a UNB/coherent HyperTransport (cHT) environment.

7. The system of claim 1, wherein the translation of request that includes an ACE write command includes splitting the ACE write command into multiple CCI write commands.

8. The system of claim 1, wherein the processor is configured to communicate writebacks sent in response to a processor probe request using an independent virtual channel.

9. The system of claim 1, wherein the gasket is further configured to:
    receive a barrier transaction that is used to provide ordering for transactions; and
    wait for all requests from the processor earlier than the barrier instruction to be issued before returning a response for the barrier transaction back to the processor.

10. The system of claim 1 wherein the gasket is further configured to block further CCI requests and wait for all outstanding CCI requests in order to change power management states.

11. A method for use in a system comprising a unified northbridge (UNB) having a cache coherent interconnect (CCI) interface and a processor having an Advanced eXtensible Interface (AXI) coherency extension (ACE) interface using a gasket communicatively coupled between the UNB and the processor, the method comprising:
    receiving, using the gasket, requests from the processor, wherein the requests include ACE commands; and
    translating, using the gasket, the requests from the processor into equivalent CCI commands, wherein each request from the processor maps onto a specific CCI request type.

12. The method of claim 11 further comprising translating, by the gasket, ACE tags into CCI tags.

13. The method of claim 11 further comprising serializing, by the gasket, ACE requests having the same ACE tag within the gasket in order to prevent transactions with duplicate tags from reaching the UNB.

14. The method of claim 11 further comprising translating, by the gasket, CCI encoded probes from a system resource interface (SRI) into equivalent ACE snoop transactions.

15. The method of claim 11 further comprising using, by the gasket, a memory map to create expected auxiliary address type signals to be sent with each request to a system resource interface (SRI).

16. The method of claim 15 further comprising translating the memory map to inter-operate with a UNB/coherent HyperTransport (cHT) environment.

17. The method of claim 11, wherein the translating of a request that includes an ACE write command includes splitting the ACE write command into multiple CCI write commands.

18. The method of claim 11 further comprising communicating, by the processor, writebacks sent in response to a processor probe request using an independent virtual channel.

19. The method of claim 11 further comprising:
receiving a barrier transaction that is used to provide ordering for transactions; and
waiting for all requests from the processor earlier than the barrier instruction to be issued before returning a response for the barrier transaction back to the processor.

20. The method of claim 11 further comprising blocking, by the gasket, further CCI requests and waiting for all outstanding CCI requests in order to change power management states.

* * * * *